(12) United States Patent
Son et al.

(10) Patent No.: US 10,020,501 B2
(45) Date of Patent: Jul. 10, 2018

(54) METHODS OF FORMING CARBON COATINGS

(71) Applicant: Samsung Electronics Co., Ltd., Suwon-si, Gyeonggi-do (KR)

(72) Inventors: In Hyuk Son, Yongin-si (KR); Jun Young Mun, Seoul (KR); Jin Hwan Park, Seoul (KR); Chan Ho Pak, Seoul (KR); Seung Jae Lee, Suwon-si (KR); Hyo Rang Kang, Anyang-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/685,424

(22) Filed: Aug. 24, 2017

(65) Prior Publication Data

US 2017/0352880 A1    Dec. 7, 2017

Related U.S. Application Data

(62) Division of application No. 14/201,089, filed on Mar. 7, 2014, now Pat. No. 9,748,561.

(30) Foreign Application Priority Data

Mar. 8, 2013 (KR) .................. 10-2013-0025139
Oct. 11, 2013 (KR) .................. 10-2013-0121468

(51) Int. Cl.
*H01M 4/13* (2010.01)
*H01M 4/36* (2006.01)
(Continued)

(52) U.S. Cl.
CPC .......... *H01M 4/366* (2013.01); *H01M 4/485* (2013.01); *H01M 4/505* (2013.01); *H01M 4/525* (2013.01);
(Continued)

(58) Field of Classification Search
CPC ...................................... H01M 4/13
See application file for complete search history.

(56) References Cited

U.S. PATENT DOCUMENTS 7,314,683 B2    1/2008  Choi et al.
2004/0157127 A1    8/2004  Choi et al.
(Continued)

FOREIGN PATENT DOCUMENTS

KR    10-0490549 B1    5/2005
KR    2008-0095980 A    10/2008
WO    WO-2011/032264 A1    3/2011

*Primary Examiner* — Jacob Marks
(74) *Attorney, Agent, or Firm* — Harness, Dickey & Pierce, P.L.C.

(57) ABSTRACT

A method of forming a carbon coating includes heat treating lithium transition metal composite oxide $Li_{0.9+a}M_bM'_cN_dO_e$, in an atmosphere of a gas mixture including carbon dioxide and compound $C_nH_{(2n+2-a)}[OH]_a$, or compound $C_nH_{(2n)}$, wherein M and M' are different from each other and are selected from Ni, Co, Mn, Mo, Cu, Fe, Cr, Ge, Al, Mg, Zr, W, Ru, Rh, Pd, Os, Ir, Pt, Sc, Ti, V, Ga, Nb, Ag, Hf, Au, Cs, B, and Ba, and N is different from M and M' and is selected from Ni, Co, Mn, Mo, Cu, Fe, Cr, Ge, Al, Mg, Zr, W, Ru, Rh, Pd, Os, Ir, Pt, Sc, Ti, V, Ga, Nb, Ag, Hf, Au, Cs, B, Ba, and a combination thereof, or selected from B, F, S, and P, and at least one of the M, M', and N comprises Ni, Co, Mn, Mo, Cu, or Fe.

9 Claims, 24 Drawing Sheets

(51) Int. Cl.
*H01M 4/505* (2010.01)
*H01M 4/525* (2010.01)
*H01M 4/62* (2006.01)
*H01M 10/052* (2010.01)
*H01M 4/485* (2010.01)

(52) U.S. Cl.
CPC ......... *H01M 4/625* (2013.01); *H01M 10/052* (2013.01); *Y02T 10/7011* (2013.01)

(56) References Cited

U.S. PATENT DOCUMENTS

| | | | |
|---|---|---|---|
| 2007/0224509 A1* | 9/2007 | Aramata | H01M 4/131 429/231.95 |
| 2008/0070122 A1* | 3/2008 | Park | H01M 4/131 429/330 |
| 2009/0148773 A1 | 6/2009 | Volkov et al. | |
| 2012/0237833 A1 | 9/2012 | Guerfi et al. | |

* cited by examiner

METHODS OF FORMING CARBON COATINGS

CROSS-REFERENCE TO RELATED APPLICATION

This application is a divisional application of U.S. application Ser. No. 14/201,089, filed on Mar. 7, 2014, which claims priority under 35 USC § 119 to Korean Patent Application Nos. 10-2013-0025139 and 10-2013-0121468, filed in the Korean Intellectual Property Office on Mar. 8, 2013 and Oct. 11, 2013, respectively, the entire disclosure of each of which is hereby incorporated by reference herein.

BACKGROUND

1. Field

Methods of forming carbon coatings, a composite metal oxide coated with carbon, and/or a lithium ion battery including the same are disclosed.

2. Description of the Related Art

Lithium ion batteries (LiB) typically have high energy density and may be easily fabricated into various designs, and thus have been widely used as an electricity source for portable devices. Recently, as the application of LiB has been extended to power supplies for an electric vehicle and for electrical power storage portable devices, vigorous research has been made on materials that make it possible to realize high energy density and a long battery life-span. One of methods improving battery performance is coating the surface of a composite metal oxide, for example, a positive electrode active material.

In order to improve battery performances in many respects, various coating materials have been proposed. Metal oxides and metal fluorides such as $Al_2O_3$, $MgO$, and $AlF_3$ are examples of such coating materials. Additives capable of forming a film on the electrode surface may play a role in reducing or preventing an electrolyte from directly contacting the surface of the positive electrode, and thereby suppress side reactions caused by electrons transferred therefrom. Such additives may also play a role in eliminating side products that are generated during the charge/discharge cycle in the battery, and thereby impair cell performance. In particular, a carbon coating may improve conductivity of a composite oxide material (e.g., a positive electrode active material), which has an otherwise low conductivity. With the exception of phosphoric acid-based positive electrode materials, however, oxide-based positive electrode materials present difficulties in having a carbon coating thereon due to a $CO_2$ generating reaction that occurs during carbonization.

Recently, growing demand for high energy density have led to a greater need for high voltage positive electrode active materials. However, under a high voltage circumstance, electrolytes are particularly susceptible to oxidation on the surface of a positive electrode active material (i.e., a composite metal oxide material), and thus there remains an urgent need to develop a coating material that may suppress oxidation in the high voltage positive electrode active material. On the other hand, the high voltage positive electrode active material usually includes more lithium and thus has a low level of conductivity, resulting in poor battery performance. In addition, unlike batteries for small and mobile devices, batteries for electric vehicles and electrical power storages are operated and/or kept under such a high-temperature atmosphere and their charge/discharge proceeds so fast that the battery temperature is apt to increase. Therefore, the batteries for electric vehicles/electrical power storages should be able to properly operate even at high temperatures and are desired to have a high level of energy storage efficiency.

In order to improve properties (e.g., battery performance), various attempts were made to form a carbon coating on the surface of the lithium transition metal composite oxide, for example, a positive electrode active material for a lithium ion battery. However, in most conventional attempts, organic materials capable of providing a carboneceous material via thermal decomposition (i.e., a carbon organic precursor) are mixed with a composite metal oxide (e.g., positive electrode active material) or a precursor thereof and then heat-treated to create a carbon coating on the surface of the composite metal oxide. According to such conventional methods, when the mixture of the carbon organic precursor and the oxide-based positive electrode material is heat-treated, the positive electrode active material may suffer an oxygen elimination reaction and thereby has a lower capacity. Moreover, the positive electrode active material may hardly have a uniform carbon coating thereon, and particularly in case of the active material with pores, the inner surfaces of the pores may not have carbon coatings. On the other hand, in order to obtain a crystalline carbon coat having high conductivity, a heat treatment may have to be conducted at a higher temperature, but such a high temperature may cause structural deformation of the active material, and this may lead to a loss of the battery characteristics.

In order for a lithium ion battery to be applied in electrical power storages/electric vehicles, the positive electrode active material may have a high capacity. To this end, for example, use of a positive electrode active material including a higher amount of lithium such as an overlithiated oxide (OLO) has been suggested, but the electron conductivity of the positive electrode active material is too low to obtain good results in terms of a battery life span and a charge/discharge rate. The carbon coating as supplied onto the OLO-based lithium positive electrode active material may be expected to improve the conductivity, but the OLO having carbon coatings applied thereon according to the conventional methods is apt to suffer severe deformation of its crystalline structure so that it becomes useless as a positive electrode active material.

In addition, when the battery is subjected to a charging/discharging process at a high voltage in order to increase capacity, the electrolyte may be easily decomposed on the cathode surface, and the metal component of the active material on the cathode surface may tend to be dissolved into the electrolyte and the dissolved salts may undergo electrodeposition again. Such side reactions on the surface may lead to self-discharge when the battery is stored at a high temperature and they may result in the decrease of the capacity when the battery is charged/discharged at a high temperature.

SUMMARY

At least one example embodiment relates to a method of forming a carbon coating on a composite metal oxide such as a positive electrode active material via a simple process without structural deformation of the material.

Another example embodiment relates to a carbon-coated composite metal oxide that may improve battery life span and high-temperature storage characteristics and may realize a high level of energy density.

A further example embodiment relates to a rechargeable lithium battery including the carbon-coated composite metal oxide as a positive electrode active material.

One example embodiment provides a method of forming a carbon coating, which includes heat-treating a lithium transition metal composite oxide represented by Chemical Formula 2 in an atmosphere of a gas mixture including carbon dioxide together with either a compound represented by the following Chemical Formula 1-1 or a compound represented by the following Chemical Formula 1-2:

$$C_nH_{(2n+2-a)}[OH]_a \quad \text{[Chemical Formula 1-1]}$$

wherein n is an integer equal to a value between 1 and 20 and a is 0 or 1;

$$C_nH_{(2n)} \quad \text{[Chemical Formula 1-2]}$$

wherein n is an integer equal to a value between 2 and 6; and $$Li_{0.9+a}M_bM'_cN_dO_e. \quad \text{[Chemical Formula 2]}$$

wherein, $0 \leq a \leq 1.6$, $0 \leq b \leq 2$, $0 \leq c \leq 2$, $0 \leq d \leq 2$; b, c, and d are the same or different and are not simultaneously equal to 0; e is necessary for charge-balancing between each element and oxygen in the oxide and ranges from 1 to 4; M and M' are different from each other and are each a metal element selected from Ni, Co, Mn, Mo, Cu, Fe, Cr, Ge, Al, Mg, Zr, W, Ru, Rh, Pd, Os, Ir, Pt, Sc, Ti, V, Ga, Nb, Ag, Hf, Au, Cs, B, Ba, and a combination thereof; and N is an element that is different from M and M' and is a metal element selected from Ni, Co, Mn, Mo, Cu, Fe, Cr, Ge, Al, Mg, Zr, W, Ru, Rh, Pd, Os, Ir, Pt, Sc, Ti, V, Ga, Nb, Ag, Hf, Au, Cs, B, and Ba, or an element selected from Ti, V, Si, B, F, S, and P, provided that at least one of the M, M', and N includes Ni, Co, Mn, Mo, Cu, or Fe.

The lithium transition metal composite oxide may be a nickel-cobalt-manganese (NCM) oxide represented by Chemical Formula 2-1:

$$LiNi_aCo_bMn_cMe_dO_2 \quad \text{[Chemical Formula 2-1]}$$

wherein, a is a number of 0.01 to 0.9, b is a number of 0.01 to 0.9, c is a number of 0.01 to 0.9, d is a number between 0 and 0.5, a+b+c+d=1, Me is Al, Ti, Si, or a combination thereof.

The compound represented by Chemical Formula 1-1 or the compound represented by Chemical Formula 1-2 may include methane ($CH_4$), ethane, propane, ethylene, propylene, methanol, ethanol, propanol, or a combination thereof.

The gas mixture may further include water vapor.

The gas mixture may further include an inert gas selected from nitrogen, helium, argon, and a combination thereof.

The heat treating may be performed at a temperature of less than or equal to about 1000° C.

The heat treating may be performed under a gas pressure of greater than or equal to about 1 atm.

The heat treating may be performed for 10 minutes or more.

The lithium transition metal composite oxide may be a positive electrode active material.

The lithium transition metal composite oxide may be an overlithiated oxide (OLO) represented by Chemical Formula 3 and having a lithium content of a mole ratio of greater than 1.

$$Li_{1+a}M_bM'_cN_dO_e \quad \text{[Chemical Formula 3]}$$

In the above Chemical Formula 3, $0 < a \leq 1.5$, $0 \leq b \leq 2$, $0 \leq c \leq 2$, $0 \leq d \leq 2$, b, c, and d are not simultaneously equal to 0, e is a number necessary for charge-balancing in the oxide and an integer ranging from 2 to 4, M, M', and N are different from each other and are selected from Ni, Co, Mn, Mo, Cu, Fe, Cr, Ge, Al, Mg, Zr, W, Ru, Rh, Pd, Os, Ir, Pt, Sc, Ti, V, Ga, Nb, Ag, Hf, Au, Cs, B, and Ba, provided that at least one of the M, M', and N includes Ni, Co, Mn, Mo, Cu, or Fe.

Another example embodiment provides a composite metal oxide represented by the above Chemical Formula 2, the metal oxide having a carbon coating uniformly formed thereon.

The composite metal oxide may be a positive electrode active material for a lithium rechargeable battery.

The composite metal oxide represented by the above Chemical Formula 2 may be an overlithiated oxide (OLO) represented by the above Chemical Formula 3.

The carbon coating may be uniformly distributed on the composite metal oxide and may have uniform distribution of carbon atoms as determined by carbon mapping of an energy dispersive X-ray spectrum (EDS) of the composite metal oxide.

Another example embodiment provides a rechargeable lithium battery including a positive electrode active material including a composite metal oxide represented by the above Chemical Formula 2 and a carbon coating uniformly formed on the composite metal oxide.

There is provided a positive electrode active material for a rechargeable lithium battery that includes a chemical carbon coating and thereby may inhibit a reaction between the electrode materials and the electrolyte at a high temperature under a high voltage and may exhibit a high level of conductivity.

(400WR_20 h) as a positive electrode active material, according to at least one example embodiment.

Figure 8:
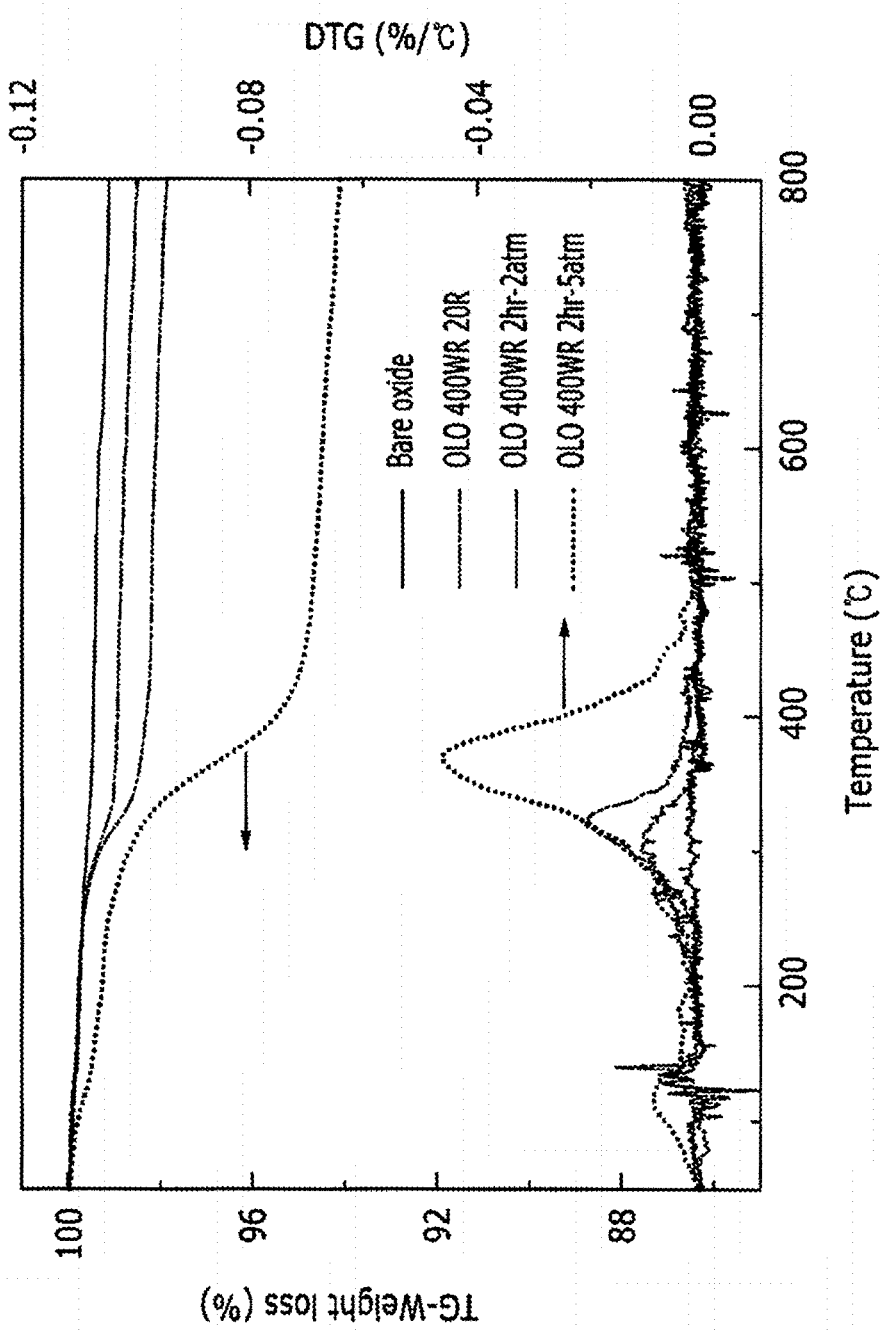

FIG. 8 shows TGA-DTGA curves, which are thermogravimetric analysis results of carbon-coated lithium transition metal composite oxides obtained from Examples 4 to 6, according to at least one example embodiment.

Figure 9:
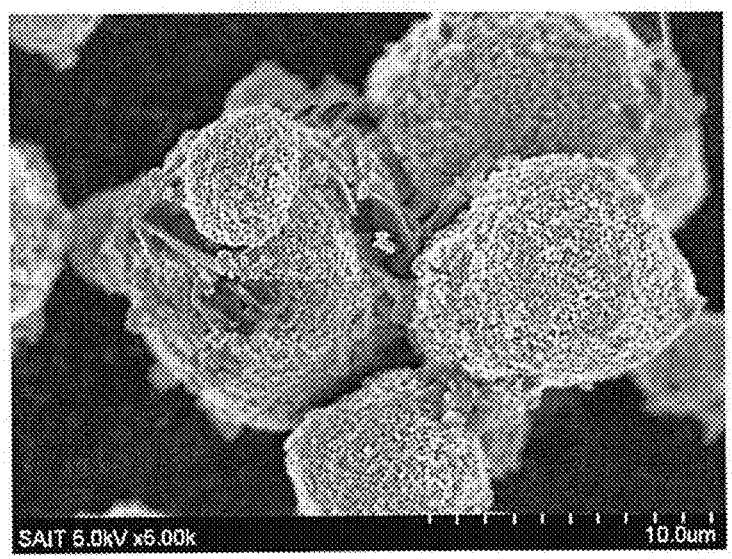
Figure 10:
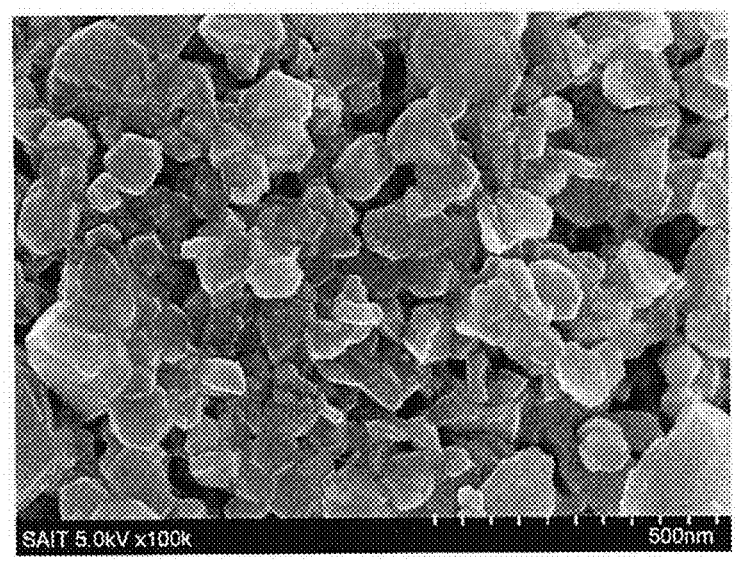

FIG. 9 and FIG. 10 are electron microscope photographs of a carbon-coated lithium transition metal composite oxide of Example 6, according to at least one example embodiment.

Figure 11:
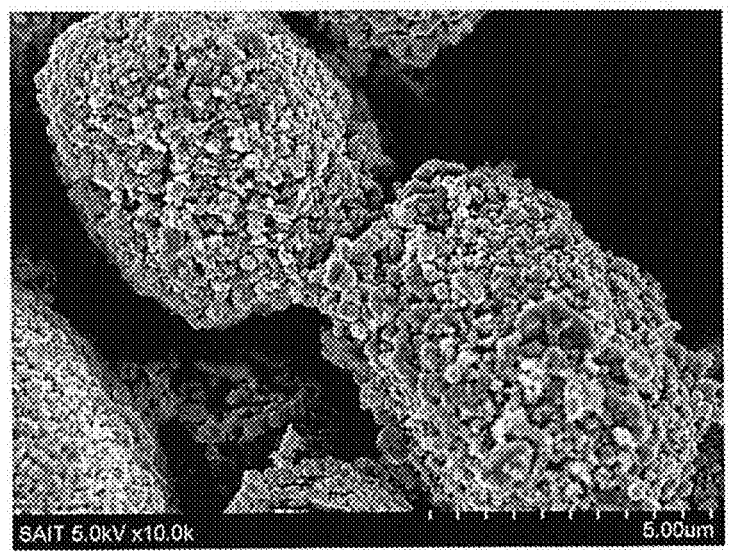
Figure 12:
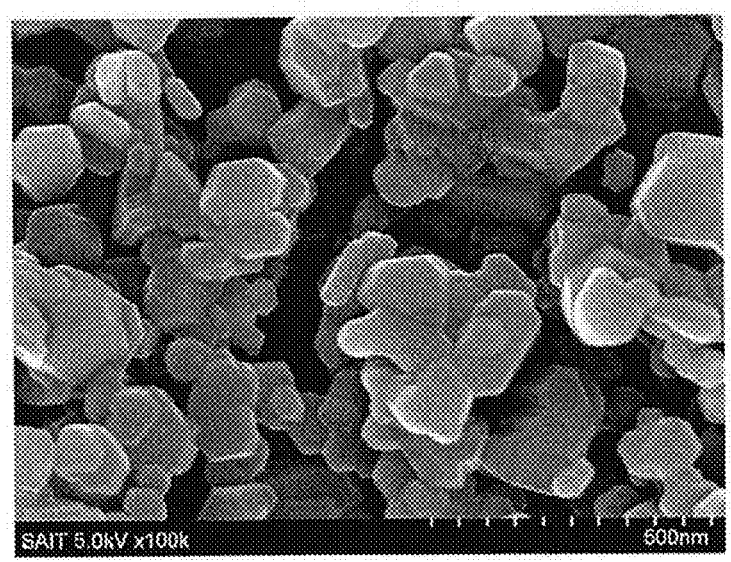
Figure 13:
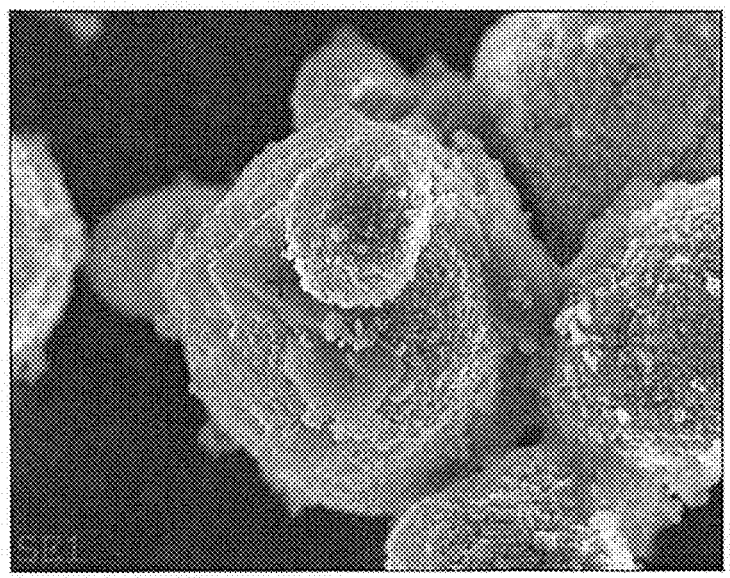
Figure 14:
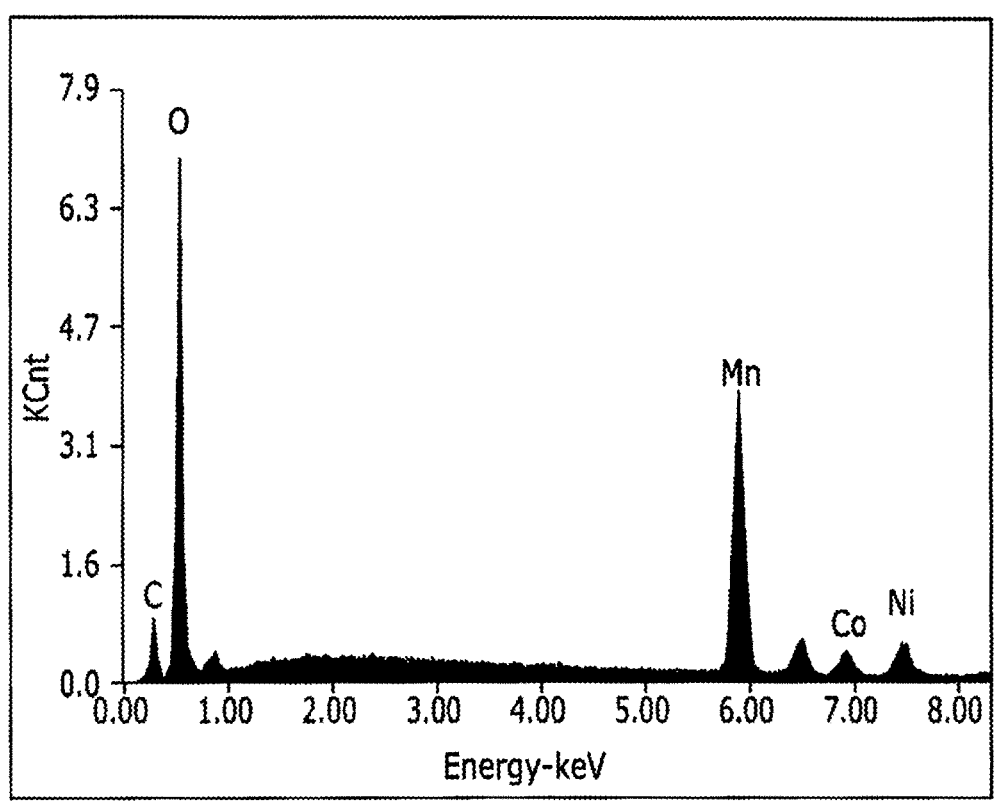
Figure 15:
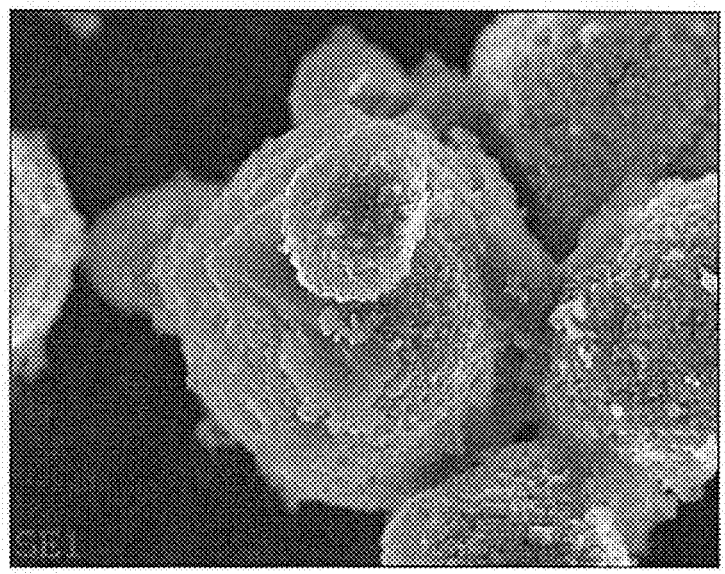
Figure 16:
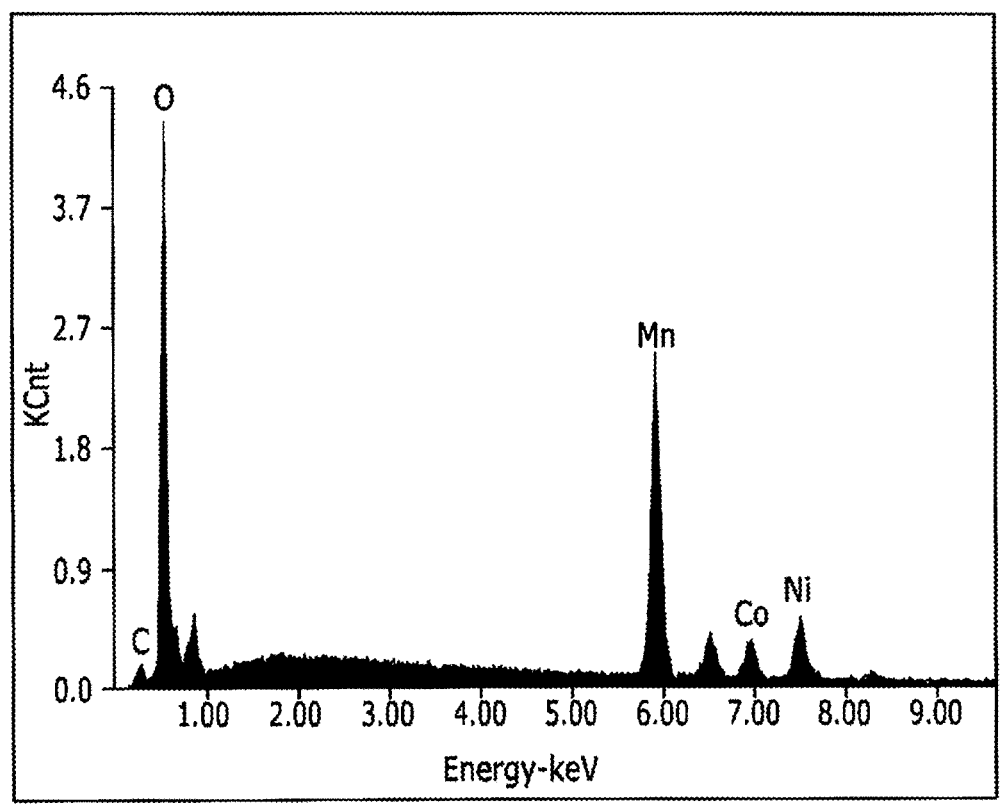

FIG. 11 and FIG. 12 are electron microscope photographs of a non-coated lithium transition metal composite oxide, according to at least one example embodiment.

FIG. 13 to FIG. 16 are views illustrating the results of Point EDX test for the carbon-coated lithium transition metal composite oxide obtained from Example 6, according to at least one example embodiment.

Figure 17:
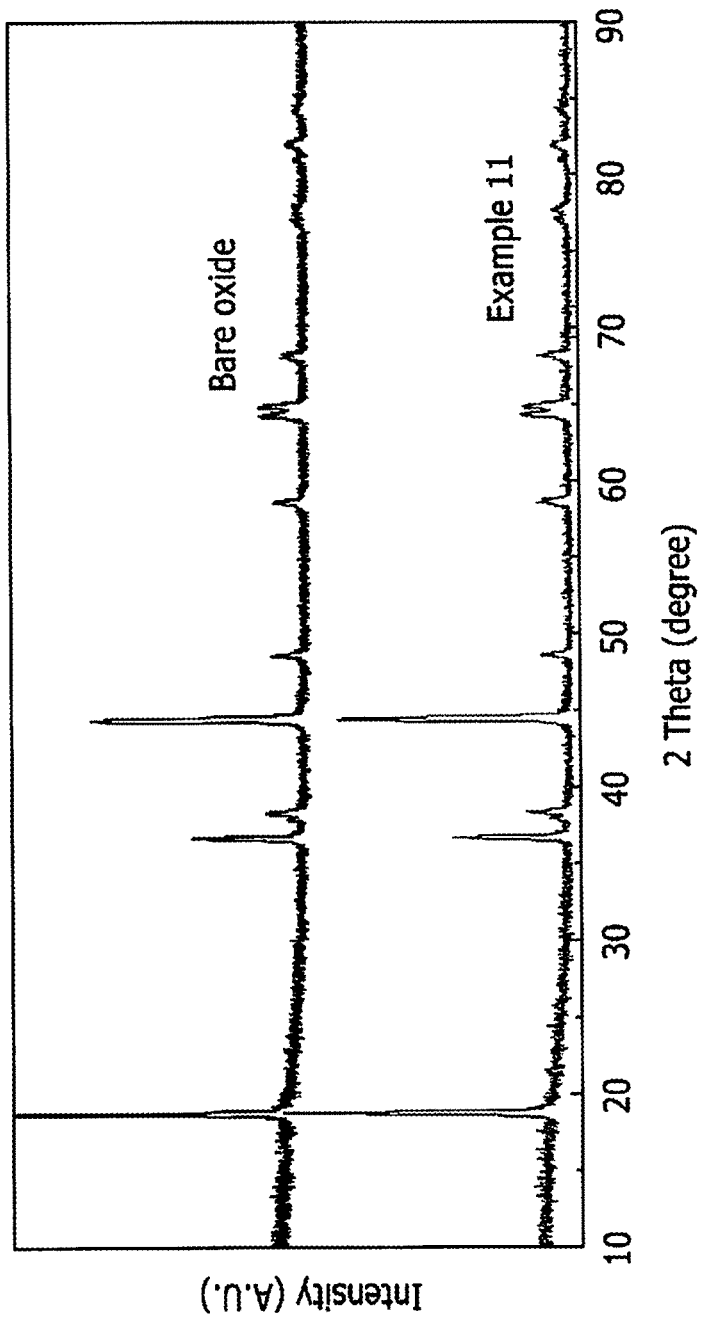

FIG. 17 includes XRD spectrums of the bare oxide and the carbon coated composite metal oxide prepared in Example 11, according to at least one example embodiment.

Figure 18:
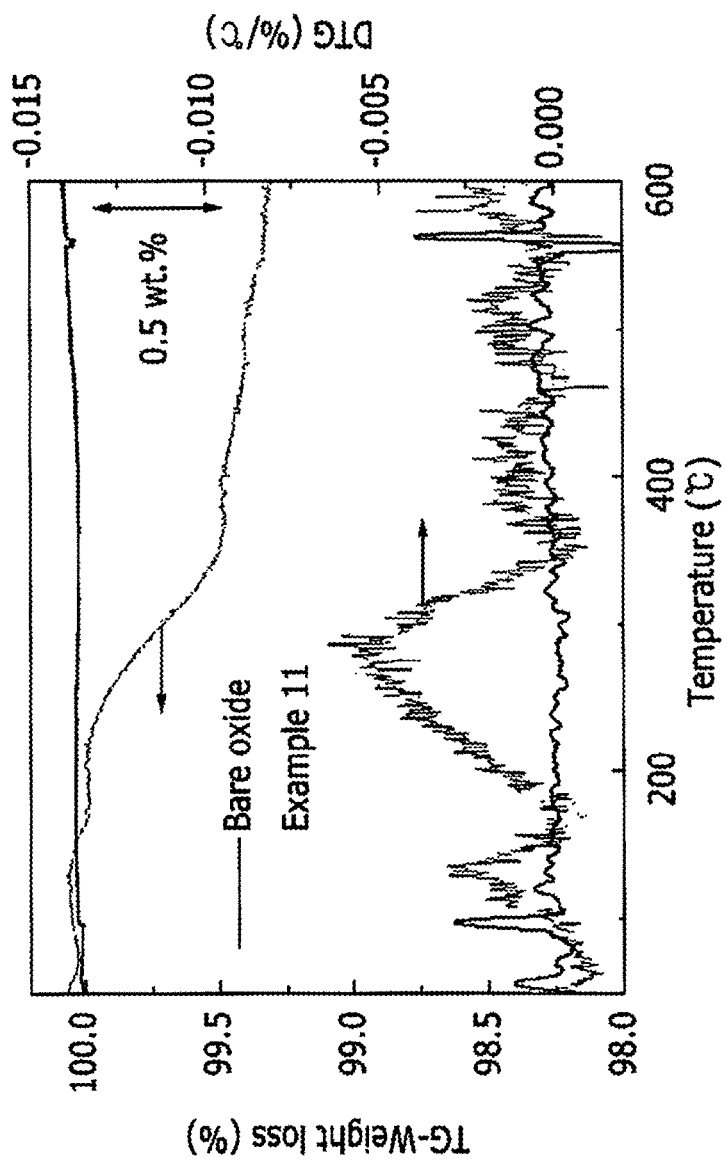

FIG. 18 includes TGA-DTGA curves, which are thermogravimetric analysis results of the bare composite metal oxide and the carbon-coated composite metal oxide obtained from Example 11, according to at least one example embodiment.

Figure 19:
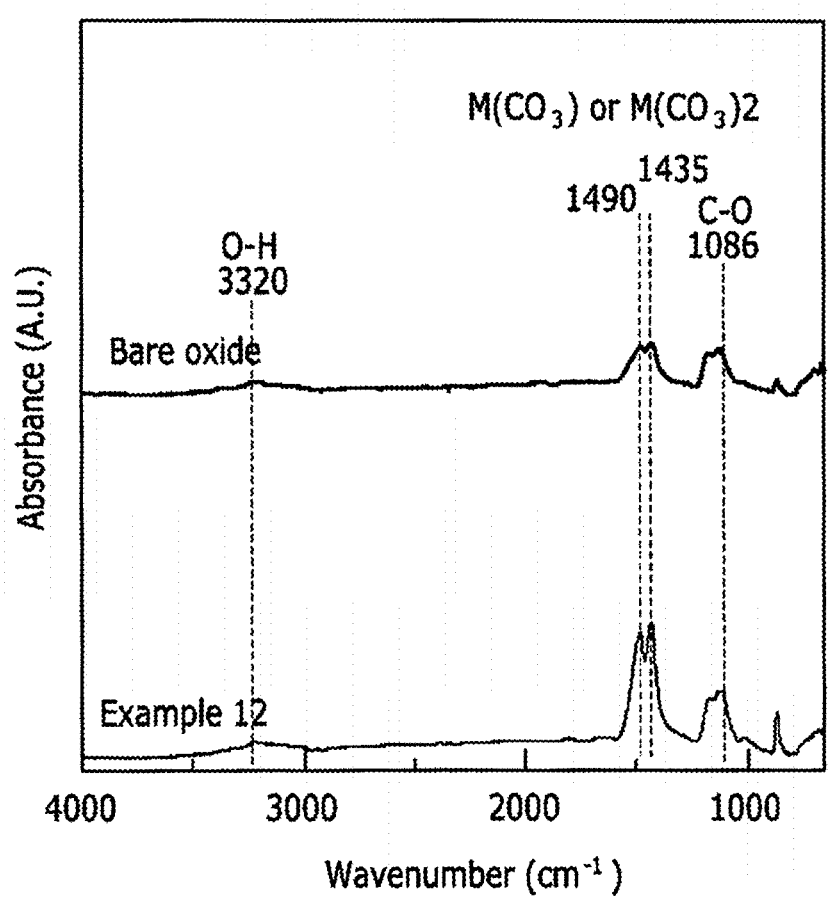

FIG. 19 includes the results of FT-IR spectroscopy analysis of the bare composite metal oxide and the carbon-coated composite metal oxide obtained from Example 12, according to at least one example embodiment.

Figure 20:
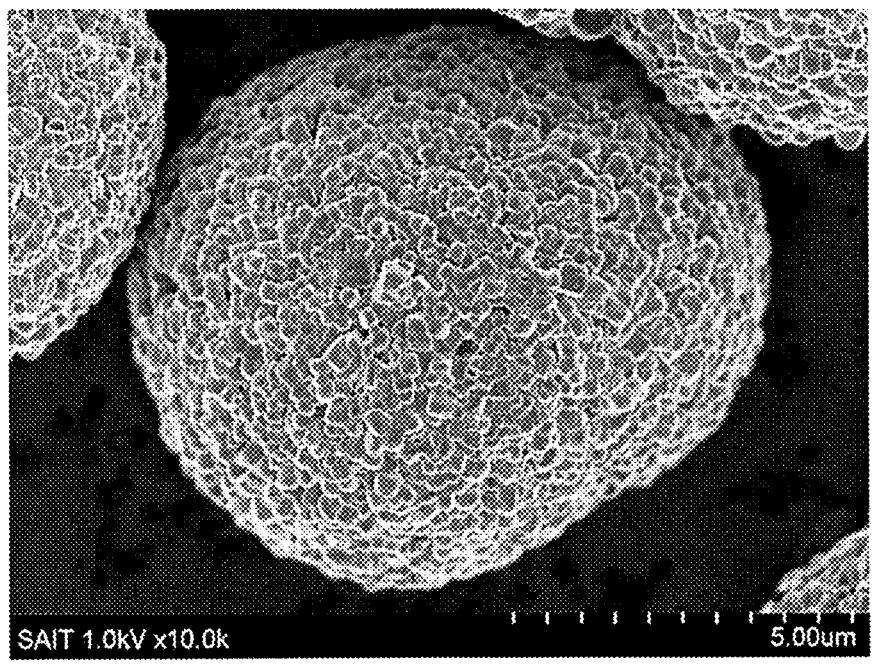
Figure 21:
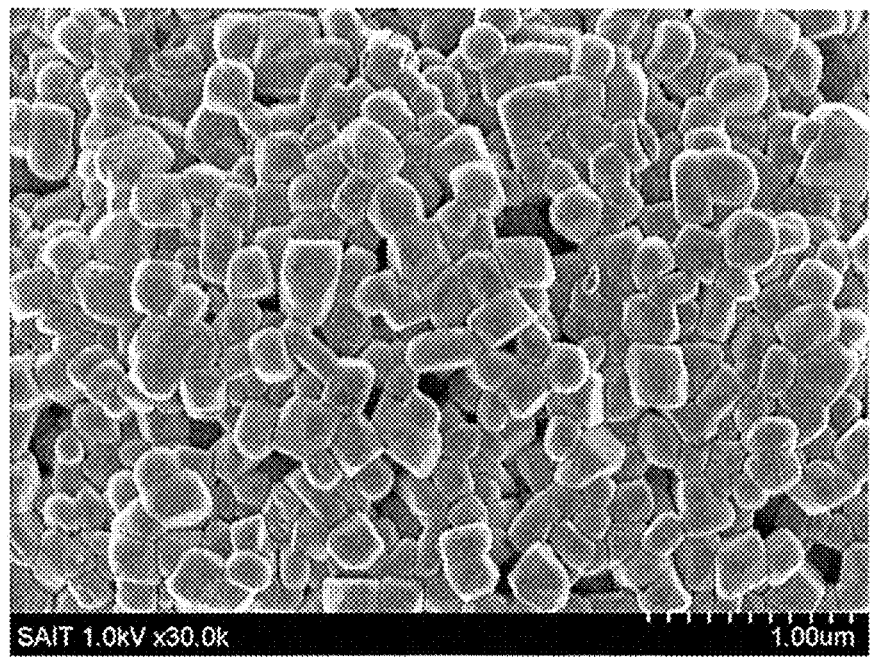

FIG. 20 and FIG. 21 are electron microscope photographic images of the bare composite metal oxide being used in Example 11, according to at least one example embodiment.

Figure 22:
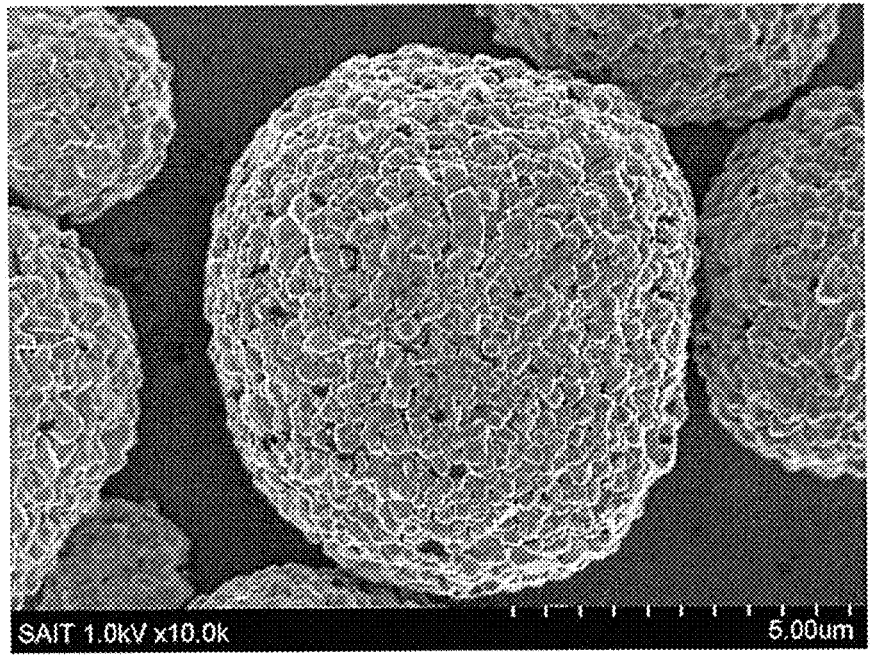
Figure 23:
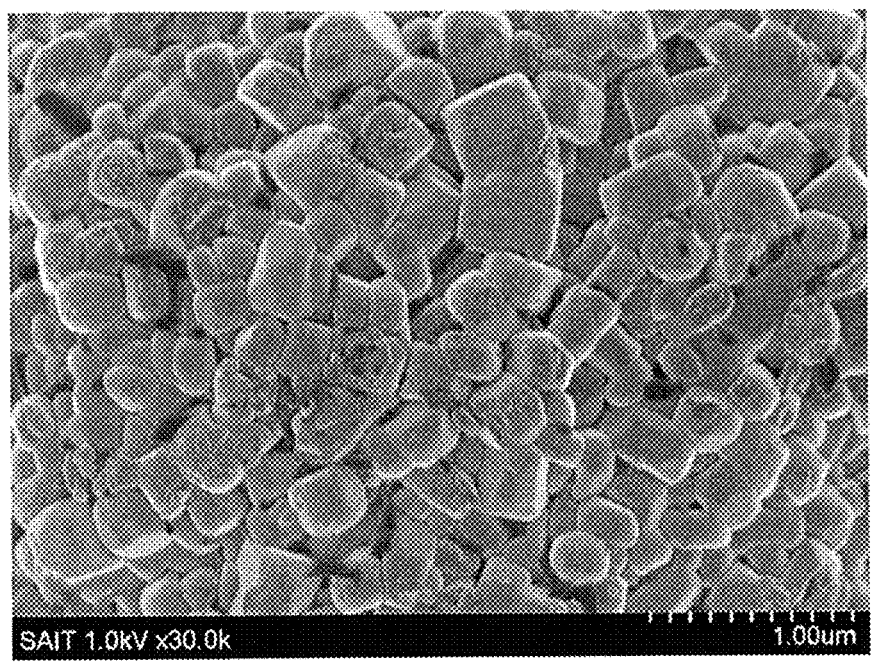

FIG. 22 and FIG. 23 are electron microscope photographic images of a carbon-coated composite metal oxide of Example 11, according to at least one example embodiment.

Figure 24:
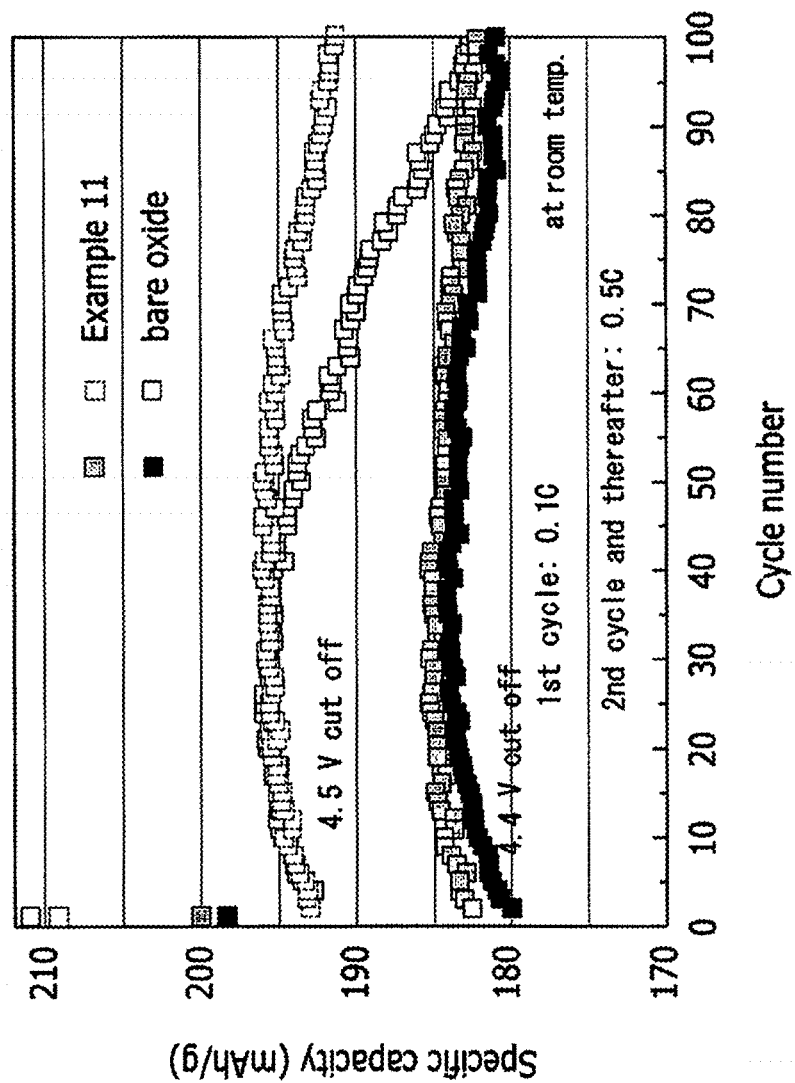

FIG. 24 is a view illustrating the results of a cell characteristic test for a rechargeable lithium battery including the carbon-coated composite metal oxide obtained from Example 11, according to at least one example embodiment.

Figure 25:
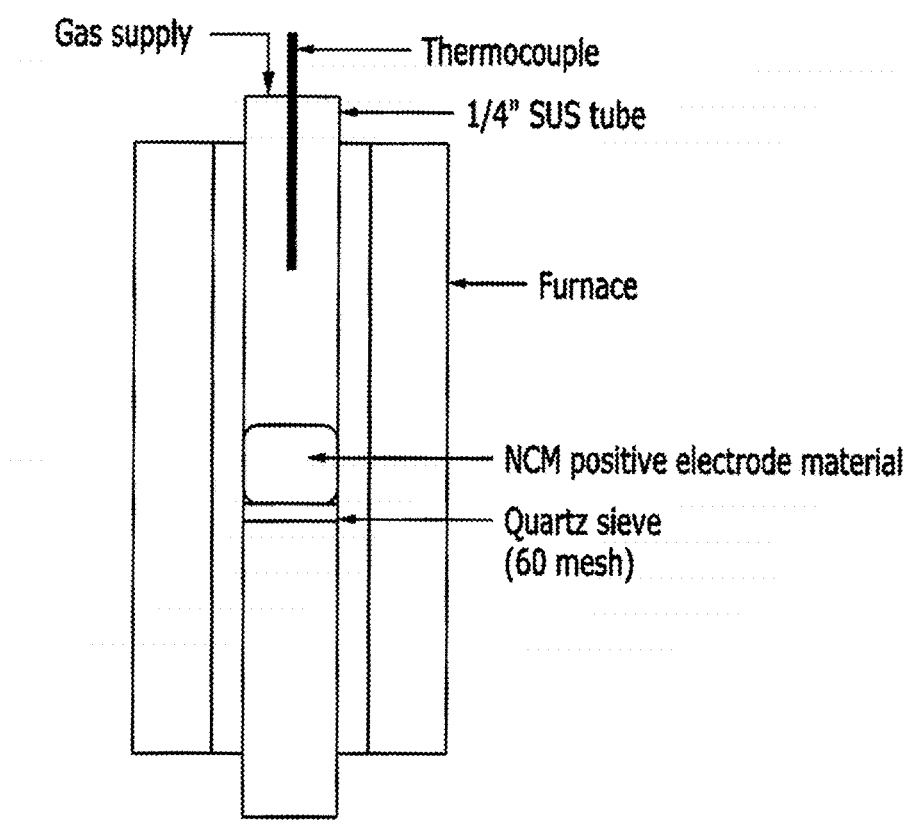

FIG. 25 is a view schematically illustrating an apparatus conducting a method of forming a carbon coating in accordance with a non-limiting example embodiment.

Figure 26:
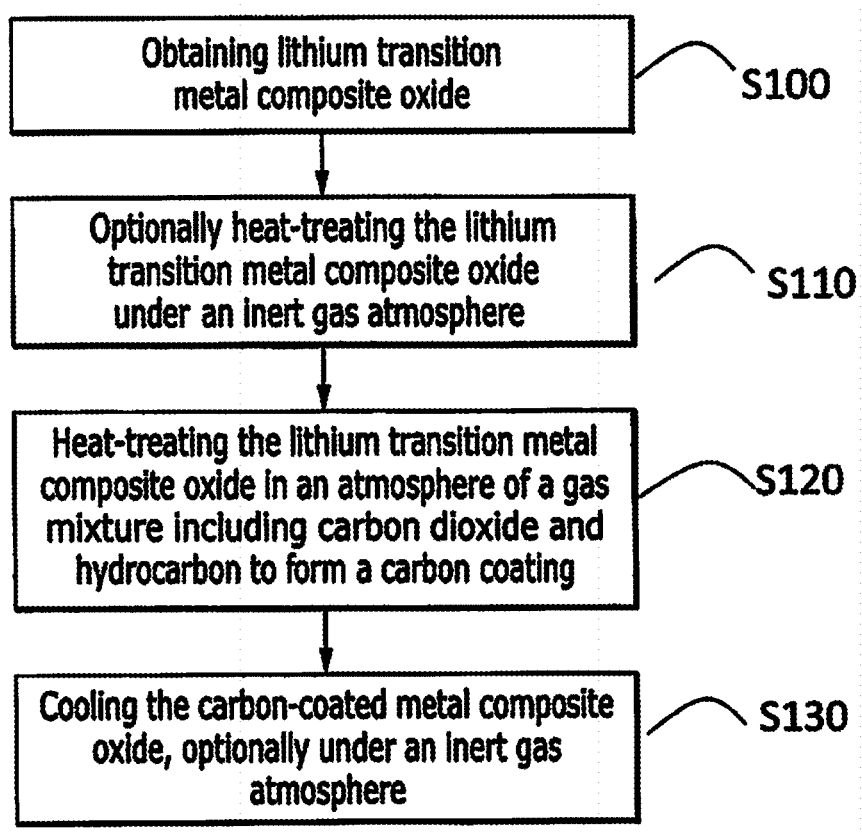

FIG. 26 is a flow chart describing a method of forming a carbon coating in accordance with a non-limiting example embodiment.

DETAILED DESCRIPTION

The advantages and characteristics of the at least one example embodiment, and the method of achieving them, will be clearly understood referring to accompanying drawings and example embodiments. However, at least one example embodiment is not limited to the following example embodiments, and it may be realized with different embodiments. The present example embodiments are provided to complete the disclosure of the at least one example embodiment and aid understanding of a person having ordinary knowledge in the art to fully understand the category of the at least one example embodiment, and the at least one example embodiment is defined by the claims. Thus, in some example embodiments, well-known technologies are not specifically explained to avoid ambiguous understanding of the at least one example embodiment. Unless otherwise defined, all terms used in the specification (including technical and scientific terms) may be used with meanings commonly understood by a person having ordinary knowledge in the art. Further, unless explicitly defined otherwise, the terms defined in a generally-used dictionary are not ideally or excessively interpreted. In addition, unless explicitly described to the contrary, the word "comprise" and variations such as "comprises" or "comprising, will be understood to imply the inclusion of stated elements but not the exclusion of any other elements.

Unless specifically described to the contrary, a singular form includes a plural form.

It will be understood that when an element is referred to as being "on," "connected" or "coupled" to another element, it can be directly on, connected or coupled to the other element or intervening elements may be present. In contrast, when an element is referred to as being "directly on," "directly connected" or "directly coupled" to another element, there are no intervening elements present. As used herein the term "and/or" includes any and all combinations of one or more of the associated listed items. Further, it will be understood that when a layer is referred to as being "under" another layer, it can be directly under or one or more intervening layers may also be present. In addition, it will also be understood that when a layer is referred to as being "between" two layers, it can be the only layer between the two layers, or one or more intervening layers may also be present.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

In the drawing figures, the dimensions of layers and regions may be exaggerated for clarity of illustration. Like reference numerals refer to like elements throughout. The same reference numbers indicate the same components throughout the specification.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A method of forming a carbon coating according to an example embodiment includes heat treating a lithium transition metal composite oxide represented by Chemical Formula 2 in an atmosphere of a gas mixture including carbon dioxide together with a compound represented by the following Chemical Formula 1-1 or a compound represented by the following Chemical Formula 1-2.

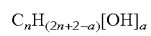  [Chemical Formula 1-1]

In the above Chemical Formula 1-1, n is 1 to 20, for example, 1 to 10, 1 to 6, or 1 to 3, and a is 0 or 1.

  [Chemical Formula 1-2]

Herein, n is 2 to 6.

  [Chemical Formula 2]

According to at least one example embodiment, the above Chemical Formula 2, $0 \leq a \leq 1.6$, $0 \leq b \leq 2$, $0 \leq c \leq 2$, $0 \leq d \leq 2$, b, c, and d are the same or different and are not simultaneously equal to 0, e is a number necessary for charge-balancing between each element and oxygen and ranges from 1 to 4, M and M' are different from each other, and are metal elements selected from Ni, Co, Mn, Mo, Cu, Fe, Cr, Ge, Al, Mg, Zr, W, Ru, Rh, Pd, Os, Ir, Pt, Sc, Ti, V, Ga, Nb, Ag, Hf, Au, Cs, B, Ba, and a combination thereof, N is an element that is different from M and M', and is a metal element selected from Ni, Co, Mn, Mo, Cu, Fe, Cr, Ge, Al, Mg, Zr, W, Ru, Rh, Pd, Os, Ir, Pt, Sc, Ti, V, Ga, Nb, Ag, Hf, Au, Cs, B, and Ba, or an element selected from Ti, V, Si, B, F, S, and P, provided that at least one of the M, M', and N includes Ni, Co, Mn, Mo, Cu, or Fe.

The lithium transition metal composite oxide may be a nickel-cobalt-manganese (NCM) oxide represented by Chemical Formula 2-1:

$$LiNi_aCo_bMn_cMe_dO_2 \quad \text{[Chemical Formula 2-1]}$$

wherein, a is a number of 0.01 to 0.9, b is a number of 0.01 to 0.9, c is a number of 0.01 to 0.9, d is a number between 0 and 0.5, a+b+c+d=1, Me is Al, Ti, Si, or a combination thereof.

The gas mixture may further include water vapor (i.e., $H_2O$ in a gas state).

The organic compound represented by the above Chemical Formula 1-1 may include methane ($CH_4$), ethane, propane, ethylene, propylene, methanol, ethanol, propanol, or a combination thereof.

The gas mixture may further include an inert gas selected from nitrogen, helium, argon, and a combination thereof.

According to at least one example embodiment, when the lithium transition metal composite oxide represented by Chemical Formula 2 is heat-treated in an atmosphere of the gas mixture including carbon dioxide and the compound represented by the above Chemical Formula 1-1 or Chemical Formula 1-2, a carbon coating is formed on the composite metal oxide. The coating formation is related with a $CO_2$ reforming of an organic compound represented by Chemical Formula 2 included in the gas mixture. For example, when the compound represented by Chemical Formula 1-1 is methane (i.e., in the above Chemical Formula 1-1, n is equal to 1 and a is equal to 0), carbon is believed to be deposited on the composite metal oxide based on a reaction that occurs as a side reaction in the reformation reaction such as Reaction Scheme 1 (i.e., Boudouard reaction represented by Reaction Scheme 2). In addition, in the case of the decomposition reaction of the compound represented by Chemical Formula 1-1 (e.g., methane), the carbon deposition occurs in accordance with Reaction Scheme 3.

$CH_4+CO_2 \longleftrightarrow 2H_2+2CO$ [Reaction Scheme 1]

$2CO \longleftrightarrow CO_2+C$ [Reaction Scheme 2]

$CH_4 \longleftrightarrow 2H_2+C$ [Reaction Scheme 3]

In the example methods of forming carbon coatings, the reaction that may occur during the heat treatment is not limited to the above-mentioned reaction, and other reactions may take place.

The example method may further include pre-treating the lithium transition metal composite oxide in an inert gas atmosphere by heating the lithium transition metal composite oxide prior to the heat-treatment in the atmosphere of the gas mixture. During pre-treatment, reduction of the metal oxide may occur. The inert gas atmosphere may include a nitrogen gas, a helium gas, an argon gas, or a combination thereof. The pre-treatment under the inert gas atmosphere (e.g., a nitrogen gas atmosphere) may be conducted by heating the oxide at a temperature of about 200° C. or higher, for example, about 350° C. to 800° C. Such a heating may be carried out for at least about one minute, for example, for about 10 minutes to about five hours, but is not limited thereto. The pre-treatment may cause the surface of the metal oxide to be reduced, enhancing the resistibility to the carbon deposition. In other words, the pre-treatment under the aforementioned conditions as to the atmosphere, the time, and the temperature may facilitate the formation of uniform carbon coating without causing deformation of the composite oxide.

In at least one example embodiment, the composite metal oxide having a carbon coating formed thereon by the aforementioned method may resolve problems inherent to conventional systems when used as a cathode active material. For example, the example method of forming a carbon coating according to one example embodiment may adopt a gaseous reaction between carbon dioxide and the compound represented by Chemical Formula 1-1 or Chemical Formula 1-2 and thereby provide a relatively or very uniform chemical carbon coating onto the positive electrode active material even at a relatively low temperature. Therefore, the at least one example embodiment resolves one of the above-discussed shortcomings of conventional techniques as to the carbon coating of the positive electrode active material. In particular, according to at least example method, a uniform carbon coating may be formed on the inner surfaces of the pores even when the active material has pores. The gas mixture including carbon dioxide and the compound represented by above Chemical Formula 1-1 or Chemical Formula 1-2 may generate the carbon deposition via various reactions (e.g., Reaction Scheme 1 to Reaction Scheme 3) at or about the heat-treating temperature. When carbon coating is formed using such carbon deposition phenomenon, the positive electrode active material does not substantially or entirely undergo the oxygen elimination reaction. In addition, since the coating is formed using a gas-phase reaction, the aforementioned method makes it possible to obtain a more uniform carbon coating than the coating obtained by the conventional art using the thermal decomposition of the mixture with the organic precursor. In addition, a high level of permeability of the gas enables the formation of a uniform carbon coating even in the inner surface of pores of the positive electrode active material. Further, a carbon coating having high crystallinity may be obtained at a relatively low temperature, so that it is possible to enhance the conductivity of the positive electrode active material without structural deformation.

According to at least one example embodiment, the composition of the gas mixture including carbon dioxide and the compound represented by Chemical Formula 1-1 or Chemical Formula 1-2 is not particularly limited, as long as the corresponding gas mixture may bring forth the carbon deposition in the presence of the lithium transition metal composite oxide represented by Chemical Formula 2, for example, via any of Reaction Scheme 1 to Reaction Scheme 3. For example, the volume ratio between carbon dioxide and the compound represented by Chemical Formula 1-1 or Chemical Formula 1-2 may range from about $1:10^{-6}$ to about $1:10^6$, for example from about $1:10^{-3}$ to about 1:1000, from about 1:0.01 to about 1:100, or from about 1:0.1 to about 1:10 based on the volume, but is not limited thereto.

According to at least one example embodiment, when the gas mixture includes water vapor, the obtained carbon-coated positive electrode active material may have a higher level of conductivity. When the reaction in the gas mixture occurs in the presence of water vapor, highly crystalline carbon materials may be deposited on the positive electrode active material and thus the positive electrode active material may exhibit a higher level of conductivity even when the positive electrode active material has a smaller amount of carbon coating formed thereon. The water vapor amount in the gas mixture is not particularly limited, and by way of an example, the water vapor may be included in an amount less than or equal to about 99%, less than or equal to about 85%, less than or equal to about 75%, less than or equal to about 65%, or less than or equal to about 60%, based on a total volume of carbon dioxide and the compound represented by Chemical Formula 1-1 or Chemical Formula 1-1.

In at least one example method of forming a carbon coating, the lithium transition metal composite oxide is represented by the following Chemical Formula 2.

$Li_{1+a}M_bM'_cN_dO_e$ [Chemical Formula 2]

In the above Chemical Formula 2, a, b, c, d, e, M, M', and N are the same as defined above.

The lithium transition metal composite oxide may be a nickel-cobalt-manganese oxide represented by Chemical Formula 2-1:

$LiNi_aCo_bMn_cMe_dO_2$ [Chemical Formula 2-1]

wherein, a, b, c, d, and Me are the same as defined above.

The lithium transition metal composite oxide represented by the above formula may include at least one selected from Ni, Co, Mn, Mo, Cu, and Fe and thus may play a role of promoting the reaction relating to the carbon deposition from the gas mixture.

According to at least one example embodiment, the lithium transition metal composite oxide may be a positive electrode active material for a rechargeable lithium battery. Specifically, the lithium transition metal composite oxide may be selected from $LiNiO_2$, $LiCoO_2$, $LiMn_2O_4$, $LiNi_xCo_{1-x}O_2$ (0<x<1), $LiNi_{1-x-y}Co_xMn_yO_2$ (0<x<1, 0<y<1, 0<x+y<1), $LiM^1_{(1-a)}M^2_aXO_4$ (wherein, in the above chemical formula, $M^1$ is Mn, Co, Cu, or Ge, $M^2$ is a transition metal other than Mo and Co, 0≤a≤0.5, and X is P, Si, V, or Ti), $LiMnPO_4$, $LiFeBO_3$, $LiFePO_4$, $LiFeVO_4$, $Li_2FeSiO_4$, $LiFeTiO_4$, $LiFeGeO_4$, $Li_xCo_{1-y-z}Ni_yM_zO_{2-a}X_a$ (1.6≥x≥0.9, 1≥y≥0, 0.5≥z≥0, 1≥a≥0, and X is O, F, S, P, or a combination thereof), $Li_xMn_{2-y}M_yO_{4-a}X_a$ (1.6≥x≥0.9, 1≥y≥0, 1≥a≥0, M is Co, Mo, W, V, Ti, Al, Zr, Ru, Rh, Pd, Os, Ir, Pt, or a combination thereof, X is O, F, S, P, or a combination thereof), and a combination thereof.

According to at least one example embodiment, the lithium transition metal composite oxide may include an overlithiated oxide (OLO) being represented by the following Chemical Formula 3, and having a lithium content of a mole ratio of greater than 1.

$Li_{1+a}M_bM'_cN_dO_e$ [Chemical Formula 3]

In the above Chemical Formula 3, 0<a≤1.5, 0≤b≤2, 0≤c≤2, 0≤d≤2, b, c, and d may not be simultaneously equal to 0, e is a number necessary for charge-balancing between each element and oxygen in the oxide and ranges from 2 to 4, and M, M', and N are different from each other and selected from Ni, Co, Mn, Mo, Cu, Fe, Cr, Ge, Al, Mg, Zr, W, Ru, Rh, Pd, Os, Ir, Pt, Sc, Ti, V, Ga, Nb, Ag, Hf, Au, Cs, B, and Ba, provided that at least one of the M, M', and N includes Ni, Co, Mn, Mo, Cu, or Fe.

The overlithiated oxide represented by the above Chemical Formula 3 may be a lithium manganese oxide. The lithium manganese oxide may be represented by the following Chemical Formula 4.

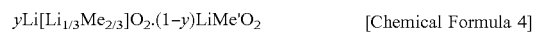

$yLi[Li_{1/3}Me_{2/3}]O_2\cdot(1-y)LiMe'O_2$ [Chemical Formula 4]

In Chemical Formula 4, 0<y≤1, Me is selected from Mn, Mo, W, V, Ti, Zr, Ru, Rh, Pd, Os, Ir, Pt, and a combination thereof, Me' is selected from Ni, Mn, Co, and a combination thereof, and one of Me and Me' includes Mn.

In the above Chemical Formula 4, Me may be represented by $M'_aM_bMn_c$, wherein M is Mo, W, V, Ti, Zr, Ru, Rh, Pd, Os, Ir, or Pt, M' is Ni, Cu, Zn, Co, Cr, Fe, or Mg, 0≤a≤0.33, 0<b≤0.33, and a+b+c=1.

According to at least one example embodiment, the temperature for heat treating the lithium transition metal composite oxide may not be particularly limited when the carbon coating is formed without substantial deformation of the structure of the composite metal oxide (e.g., a crystalline structure as confirmed by XRD). As used herein, the term "substantial deformation of a structure" refers to a structural deformation of a given composite metal oxide (e.g., positive electrode active material) resulting in a loss of desirable properties (e.g., loss of electrical properties that make it possible for the metal oxide to be used in a battery). The heat treatment may be carried out at a temperature of less than or equal to about 1000° C., for example, at a temperature of less than about 750° C., specifically at a temperature of less than or equal to about 700° C., more specifically at a temperature of less than or equal to about 650° C., more specifically at a temperature of about 100° C. to about 600° C., further more specifically at a temperature of about 200° C. to about 500° C., but is not limited thereto.

According to at least one example embodiment, the pressure of the heat treatment is not particularly limited, and may be chosen in light of the heat treatment temperature, the composition of gas mixture, the amount of desirable carbon coating, and the like. The pressure of the heat treatment may be controlled by adjusting the amount of a flowing-in gas mixture and the amount of a flowing-out gas mixture. For example, the pressure during the heat treatment may be greater than or equal to about 1 atm, for example, greater than or equal to about 2 atm, greater than or equal to about 3 atm, greater than or equal to about 4 atm, of greater than or equal to about 5 atm, but is not limited thereof.

According to at least one example embodiment, the time for heat treatment is not particularly limited, but may be properly adjusted depending on the heat treatment temperature, the pressure of the heat treatment, the composition of gas mixture, and the amount of desirable carbon coating. For example, the reaction time may range from about 10 minutes to about 100 hours, specifically from about 30 minutes to about 90 hours, and more specifically from about 50 minutes to about 40 hours, but is not limited thereto. The longer the deposition time, the more the amount of carbon tends to deposit, leading to more enhanced electrical properties of the resulting composite metal oxide. However, such tendency may not necessarily be proportional to time. By way of an example, after a predetermined time, carbon deposition may not occur any more or the deposition rate may decrease.

By means of such an example heat treatment, the carbon coating is formed on the lithium transition metal composite oxide represented by Chemical Formula 2. The coating amount is not particularly limited, but it may be properly chosen taking into account the desirable properties of the composite metal oxide (e.g., properties relating to battery characteristics). In at least one example embodiment, the amount of the coating as formed may be greater than or equal to about 0.01 wt %, for example about 0.01 to about 15 wt %, greater than or equal to about 0.1 wt %, greater than or equal to about 0.2 wt %, greater than or equal to about 0.3 wt %, greater than or equal to about 0.4 wt %, greater than or equal to about 0.5 wt %, greater than or equal to about 0.6 wt %, greater than or equal to about 0.7 wt %, or greater than or equal to about 0.8 wt %, but is not limited thereto. The amount of the carbon coating is less than or equal to about 10 wt %, for example, less than or equal to about 3 wt %, less than or equal to about 2 wt %, or less than or equal to about 1 wt %. The carbon coating amount may be controlled by adjusting the temperature, pressure, time of heat treatment, and the composition of the gas mixture. In the coating, carbon may be present in any form. By way of an example, it may be a surface carbide, an adsorbed atomic carbon, a carbonyl (C=O) moiety or a carboxylic acid (COOH) moiety, (for example, it may be mainly a metal carbonate such as $Mn(CO_3)$ or $Mn(CO_3)_2$). In some cases, it may be an amorphous carbon polymer, or a graphitic material. The lithium transition metal composite oxide such as the positive electrode active material may be heat-treated in the atmosphere of the gas mixture including carbon dioxide and the aforementioned organic compound to form a carbon coating. Unlike the coating method using the thermal decomposition of a carbon precursor organic material such as sucrose, the foregoing method may not bring about the structural deformation of the lithium transition metal composite oxide, and thus there is no decrease in the electrical properties such as electrode performance. In particular, it is possible to form a carbon coating having high crystallinity and high conductivity even at a relatively low heat treatment temperature.

According to another example embodiment, there is provided a lithium transition metal composite oxide being represented by the following Chemical Formula 2 and having a carbon coating uniformly formed on the surface of the lithium transition metal composite oxide.

  [Chemical Formula 2]

In the above Chemical Formula, a, b, c, d, e, M, M', and N are the same as defined above.

The lithium transition metal composite oxide may be a positive electrode active material for a rechargeable lithium battery.

The lithium transition metal composite oxide may be a nickel-cobalt-manganese (NCM) oxide represented by Chemical Formula 2-1:

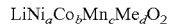  [Chemical Formula 2-1]

wherein, a, b, c, d, and Me are the same as defined above.

According to at least one example embodiment, the lithium transition metal composite oxide includes a substantially uniform carbon coating on the surface of the lithium transition metal composite oxide. The surface may include the outer surface of the composite metal oxide and the inner surface of pores when the composite metal oxide includes pores, as well. The carbon coating formed on the lithium transition metal composite oxide (e.g., positive electrode active material) may have a uniform distribution of carbon atoms on the composite metal oxide and this can be determined by carbon mapping analysis using energy dispersive X-ray spectroscopy. In the carbon-coated composite metal oxide (e.g., positive electrode active material) obtained by the prior art coating methods, the carbon coating is not uniform over the entire surface so that the carbon distribution cannot be uniform when determined by EDS carbon mapping analysis. However, according to the carbon coating of one example embodiment, carbon material is coated on the composite metal oxide (e.g., positive electrode active material) by the gaseous reaction, the resulting carbon coating having a uniform carbon distribution as determined by the EDS carbon mapping analysis may be obtained.

According to at least one example embodiment, the carbon coating on the lithium transition metal composite oxide may include a carbon material including a carbon-carbon covalent bond (e.g., C—C or C=C). The carbon coating may further include a COOH moiety or an OH moiety. The carbon material may include a carbide compound, amorphous carbon polymer or a graphitic material for example in the form of a film or a filament, but is not limited thereof.

In the lithium transition metal composite oxide, the amount of the carbon coating may be greater than or equal to about 0.01 wt %, for example about 0.01 to about 15 wt %, based on the weight of the active material.

According to at least one example embodiment, due to the carbon coating, the positive electrode active material may have a conductivity greater than or equal to about $1.0 \times 10^{-7}$ S/cm, for example, greater than or equal to about $1.8*10^{-7}$ S/cm even when the positive electrode active material is a OLO-based active material. As mentioned above, when the carbon deposition occurs in the presence of the gas mixture including water vapor, the carbon coated positive electrode active material thus obtained may have a smaller amount of carbon coating while having a higher conductivity. When the positive electrode active material is the NCM oxide, it may have a conductivity that is at least two times, for example, at least three times, at least four times, or at least five times higher than that of the bare NCM oxide without the carbon coating. For example, when the bare NCM oxide has a conductivity of $1 \times 10^{-4}$ S/cm, the carbon coated NCM oxide may exhibit a conductivity of about $5 \times 10^{-4}$ S/cm.

According to at least one example embodiment, the positive electrode active material for a lithium ion battery includes a carbon coating uniformly formed on the lithium transition metal composite oxide so that it is possible to effectively reduce or prevent electrolyte decomposition on the positive electrode surface at a high voltage. In addition, it is possible to reduce or prevent the metal of the active material from being dissolved into the electrolyte or electrodeposited at the surface of the positive electrode. Moreover, it is possible to reduce or prevent self-discharge in the battery. The self-discharge generally occurs due to the side reaction at the surface of the positive electrode active material when the positive electrode active material is stored at a high temperature. In addition, it is possible to reduce or suppress the decrease of the battery capacity resulting from a high temperature charge/discharge.

The lithium ion battery in accordance with another example embodiment includes a positive electrode active material including a composite metal oxide represented by the following Chemical Formula 2, and a carbon coating uniformly formed on the composite metal oxide surface.

$$Li_{1+a}M_bM'_cN_dO_e \quad \text{[Chemical Formula 2]}$$

In the above Chemical Formula, a, b, c, d, e, M, M', and N are the same as defined above.

Details for the lithium transition metal composite oxide, the carbon coating, and the positive electrode active material for a lithium ion battery including them are the same as set forth above.

According to at least one example embodiment, the lithium ion battery includes a positive electrode active material for a lithium ion battery including the carbon coating so that it may have an enhanced conductivity and thus may exhibit a better efficiency of first cycle charge and discharge and a higher capacity. In addition, the resistance depending on the charge and discharge rate may decrease and thereby a high-speed charge/discharge may be realized. In particular, it may be possible to reduce or prevent side reactions on the electrode surface during the charge/discharge process and to effectively suppress the electrolyte decomposition on the positive electrode surface and thus the life-span of the battery may become longer.

Hereinafter, the embodiments are illustrated in more detail with reference to examples. However, the following example embodiments are only to specifically exemplify or describe the at least one example embodiment, so these examples are not in any sense to be interpreted as limiting the scope of this disclosure.

EXAMPLES

Preparation of Carbon-Coated Positive Electrode Active Material

Example 1: OLO 400 DR 2 h

According to at least one example embodiment, about 1 g to about 5 g of a lithium transition metal composite oxide represented by a chemical formula of $Li_{1.18}Ni_{0.17}Co_{0.1}Mn_{0.56}O_2$ is disposed in a reactor as illustrated in FIG. 25. A gas mixture having a ratio of $CH_4:CO_2:N_2$ of about 100 sccm:100 sccm:100 sccm is flowed into the reactor to provide a gas mixture atmosphere in the reactor. A pressure generated by the gas mixture flow in the reactor is about 1 atm. In the atmosphere of the gas mixture, the temperature of the reactor is increased to about 400° C., and the temperature is maintained for 2 hours while the gas mixture continuously flows in the reactor to carry out a heat treatment. As a result, carbon deposition occurs on the composite metal oxide and thereby a carbon coating is formed. Then, the supply of the gas mixture stops, a nitrogen gas flows in while the reactor cools to room temperature, and then a carbon-coated composite metal oxide is recovered.

Example 2: OLO 400 WR 2 h

According to at least one example embodiment, a carbon-coated composite metal oxide is prepared in the same manner as set forth in Example 1, except that the gas mixture of the following composition is flowed in the reactor:

$CH_4:H_2O:CO_2:N_2$=1.0 sccm:0.8 sccm:0.4 sccm:2.8 sccm

Example 3: OLO 400 DR 20 h

According to at least one example embodiment, a carbon-coated composite metal oxide is prepared in the same manner as set forth in Example 1, except that the heat treatment is performed for 20 hours.

Example 4: OLO 400 WR 20 h

According to at least one example embodiment, a carbon-coated composite metal oxide is prepared in the same manner as set forth in Example 1, except that the gas mixture of the following composition is flowed in the reactor and the heat treatment is performed for 20 hours.

$CH_4:H_2O:CO_2:N_2$=1.0 sccm:0.8 sccm:0.4 sccm:2.8 sccm

Example 5: OLO 400 WR 2 h & 2 A

According to at least one example embodiment, a carbon-coated composite metal oxide is prepared in the same manner as set forth in Example 1, except for flowing the gas mixture of the following composition in the reactor and adjusting the flow of the gas mixture to make a pressure in the reactor 2 atm:

$CH_4:H_2O:CO_2:N_2$=1.0 sccm:0.8 sccm:0.4 sccm:2.8 sccm

Example 6: OLO 400 WR 2 h & 5 A

According to at least one example embodiment, a carbon-coated composite metal oxide is prepared in the same manner as set forth in Example 1, except for flowing the gas mixture of the following composition into the reactor and adjusting the flow of the gas mixture to make a pressure in the reactor 5 atm.

$CH_4:H_2O:CO_2:N_2$=1.0 sccm:0.8 sccm:0.4 sccm:2.8 sccm

Example 7: OLO 500 DR 20 h

According to at least one example embodiment, a carbon-coated composite metal oxide is prepared in the same manner as set forth in Example 1, except for heat-treating for 20 hours with the temperature in the reactor of 500° C.

Example 8: OLO 500 WR 20 h

According to at least one example embodiment, a carbon-coated composite metal oxide is prepared in the same manner as set forth in Example 1, except for heat-treating for 20 hours with the temperature in the reactor of 500° C. and flowing the gas mixture of the following composition into the reactor:

$CH_4:H_2O:CO_2:N_2$=1.0 sccm:0.8 sccm:0.4 sccm:2.8 sccm.

Example 9: OLO 600 WR/2 Times/2 h

According to at least one example embodiment, a carbon-coated composite metal oxide is prepared in the same manner as set forth in Example 1, except for adjusting the temperature in the reactor to 600° C. and flowing the gas mixture of the following composition into the reactor and repeating the heat treatment for 2 hours 2 times.

$CH_4:H_2O:CO_2:N_2=1.0$ sccm:0.8 sccm:0.4 sccm:2.8 sccm.

Example 10: OLO 700 DR 2 h

According to at least one example embodiment, a carbon-coated composite metal oxide is prepared in the same manner as set forth in Example 1, except for heat treating for 2 hours with the temperature in the reactor of 700° C.

Example 11: NCM 400 DR 1 h

According to at least one example embodiment, about 1 g to 10 g of a lithium transition metal composite oxide represented by a chemical formula of $LiNi_{0.6}Co_{0.1}Mn_{0.3}O_2$ is disposed in a reactor as illustrated in FIG. 25. $N_2$ gas is flowed into the reactor at a rate of 300 sccm while the reactor is heated upto 400° C. over one hour and then the oxide is pre-treated at this temperature for another one hour (pre-treatment). Then, a gas mixture having a ratio of $CH_4:CO_2:N_2$ of 100 sccm:100 sccm:100 sccm is flowed into the reactor to provide a gas mixture atmosphere in the reactor. A pressure generated by the gas mixture flowing into the reactor is 1 atm. In the atmosphere of the gas mixture, the temperature of the reactor is increased to 400° C., and the temperature is maintained for one hour while the gas mixture continuously flows in the reactor to carry out a heat treatment. As a result, carbon deposition occurs on the composite metal oxide to form a carbon coating. Then, the supply of the gas mixture stops, a nitrogen gas flows in while the reactor is gradually cooled to room temperature for 4 hours, and then a carbon-coated NCM composite metal oxide is recovered.

Example 12: NCM 400 DR 4 h

According to at least one example embodiment, a carbon-coated composite metal oxide is prepared in the same manner as set forth in Example 11, except heat-treating the NCM oxide at a temperature of 400° C. under the gas mixture atmosphere for 4 hours.

Example 13: NCM 500 DR 1 h

According to at least one example embodiment, a carbon-coated composite metal oxide is prepared in the same manner as set forth in Example 11, except heat-treating the NCM oxide at a temperature of 500° C. under the gas mixture atmosphere for one hour.

Example 14: NCM 600 DR 1 h

According to at least one example embodiment, a carbon-coated composite metal oxide is prepared in the same manner as set forth in Example 11, except for heat-treating the NCM oxide at a temperature of 600° C. under the gas mixture atmosphere for one hour.

Example 15: NCM 700 DR 1 h

According to at least one example embodiment, a carbon-coated composite metal oxide is prepared in the same manner as set forth in Example 11, except for heat-treating the NCM oxide at a temperature of 700° C. under the gas mixture atmosphere for one hour.

Characterization of Carbon-Coated Positive Electrode Active Material

Experimental Example 1: X-Ray Diffraction Analysis

Figure 1:
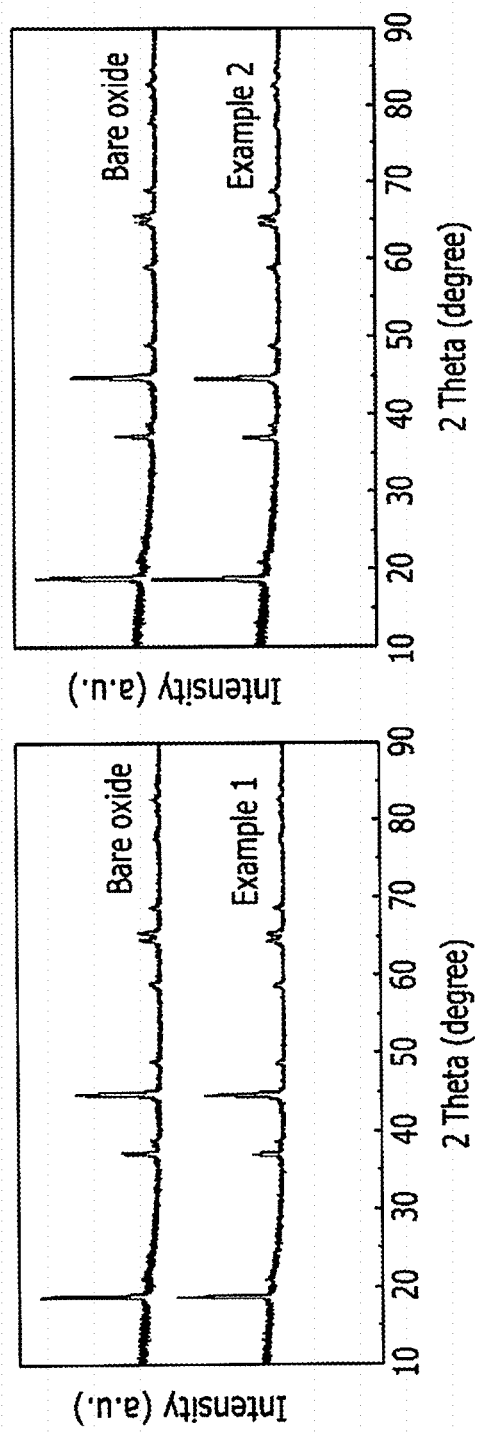
FIG. 1 shows X-ray diffraction spectra of carbon-coated composite metal oxides of Example 1 and Example 2 and a non-coated (bare) composite metal oxide, according to at least one example embodiment.

XRD analysis is made on a lithium transition metal composite oxide prior to being subjected to the heat treatment (hereinafter, referred to as a bare composite metal oxide) represented by the following chemical formula of $Li_{1.18}Ni_{0.17}Co_{0.1}Mn_{0.56}O_2$ and the carbon-coated lithium transition metal composite oxides obtained from Example 1, Example 2, and Example 11 and the results are shown in FIG. 1 and FIG. 17.

As shown in FIG. 1, the X-ray diffraction spectra of the carbon coated composite oxides obtained from Examples 1 and 2 have substantially the same peaks as in the bare composite oxide. As shown in FIG. 17, the X-ray diffraction spectra of the carbon coated composite oxides obtained from Example 11 has substantially the same peaks as in the bare composite oxide. The results imply that in the composite oxides obtained from these examples, the carbon coating is formed without any deformation of the internal structures of the oxide.

Experimental Example 2: FTIR Analysis

Figure 2:
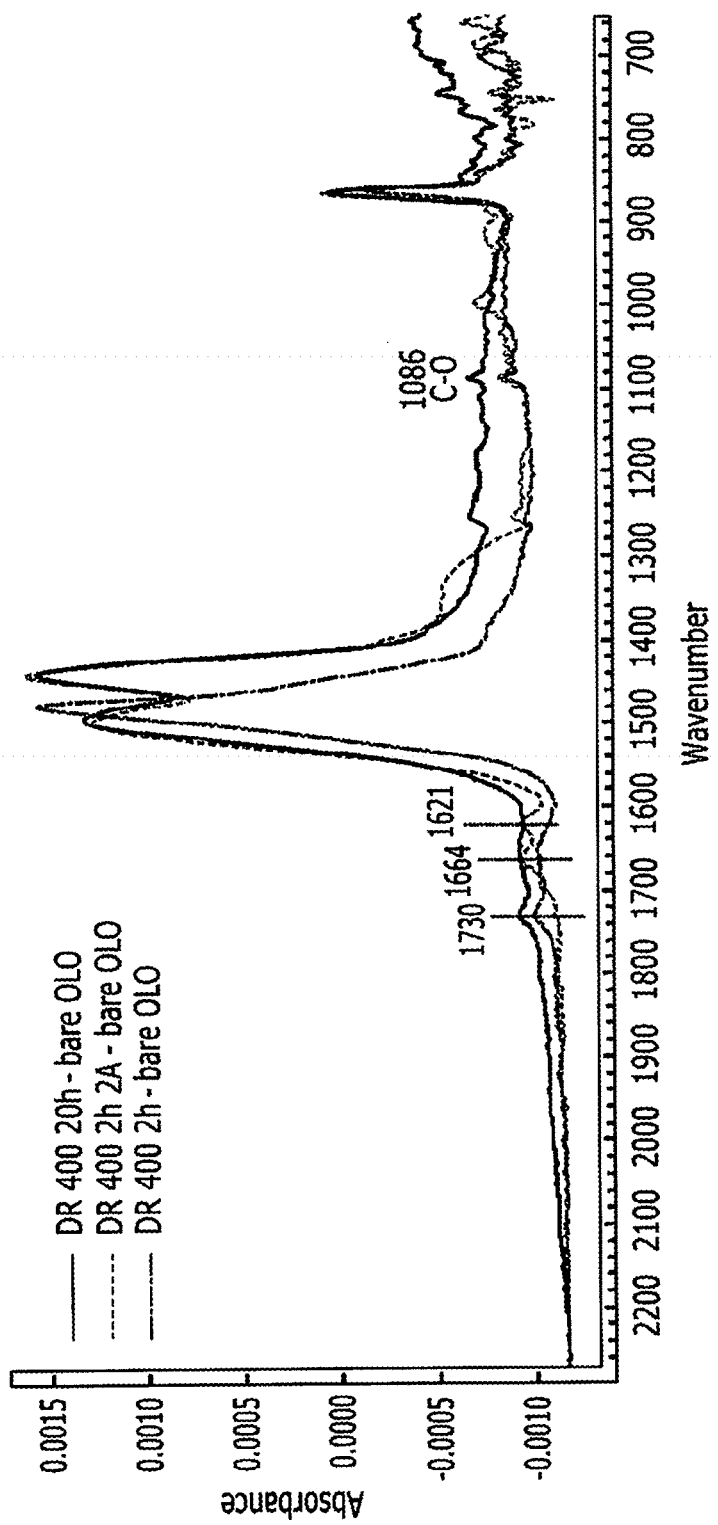
FIG. 2 shows FTIR spectra of carbon-coated composite metal oxides obtained from Example 1 (OLO 400 DR 2 h), Example 3 (OLO 400 DR 20 h), and Example 5 (OLO 400 DR 2 h & 2 A) based on the FTIR spectrum of a bare composite metal oxide (bare OLO), according to at least one example embodiment.

A FTIR analysis is made for the bare composite metal oxide and the carbon-coated composite metal oxides obtained from Example 1 (OLO 400 DR 2 h), Example 3 (OLO 400 DR 20 h), Example 5 (OLO 400 DR 2 h & 2 A), and Example 12 (NCM 400 DR 1 hr). Based on the FTIR spectrum of the non-coated composite metal oxide, the FTIR spectra of the carbon-coated composite metal oxides obtained from Example 1, Example 3, Example 5, and Example 12 are shown in FIG. 2 and FIG. 19. A carbonyl peak is detected at 1730 cm$^{-1}$ in the carbon-coated composite metal oxides obtained from Example 1 and Example 3, and peaks relating to carbonate are detected at 1664 and 1621 cm$^{-1}$ in the carbon-coated composite metal oxide obtained from Example 5. Referring to FIG. 19, the intensity of the peaks for C—O bond and M(CO$_3$) or M(CO$_3$)$_2$ bond is increased. Such results confirm that the carbon coating formed on the NCM composite metal oxide includes manganese carbonate and a carbonyl moiety.

Figure 3:
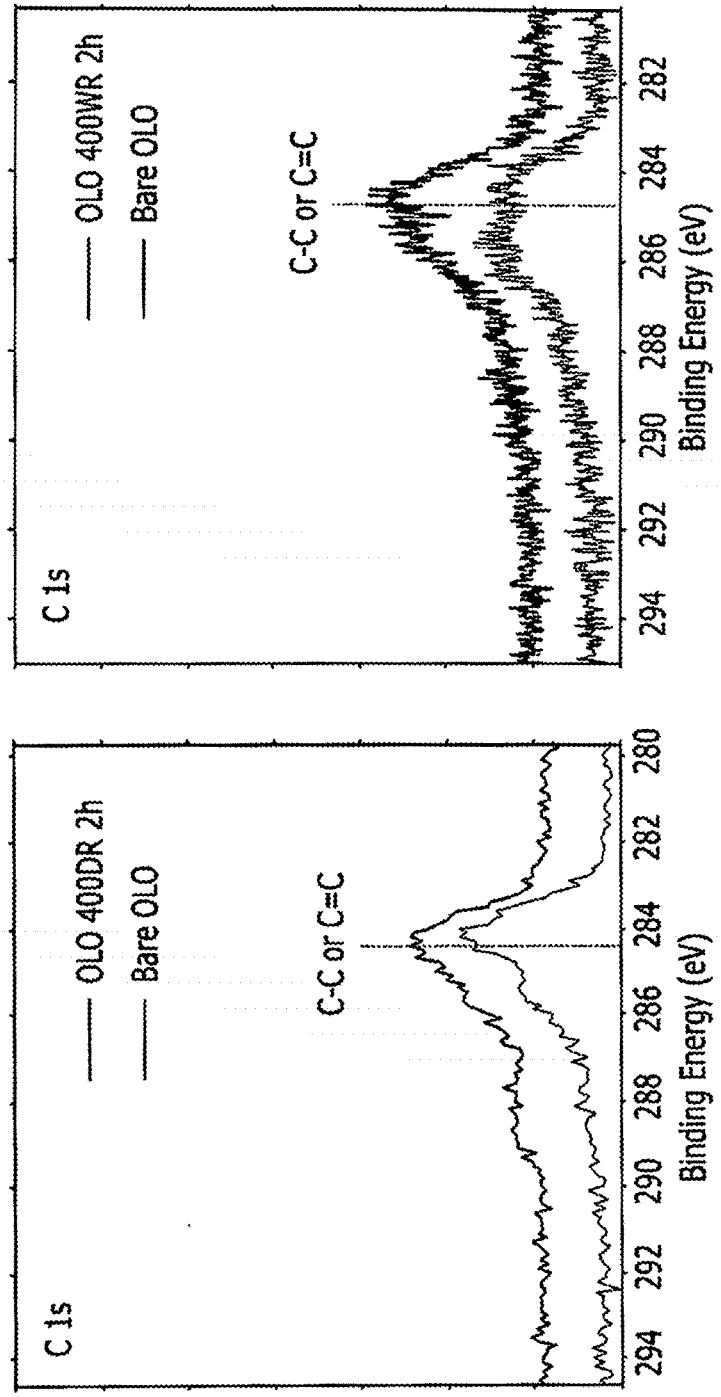
FIG. 3 shows XPS analysis results of the carbon-coated composite metal oxides obtained from Example 1 (OLO 400 DR 2 h) and Example 2 (OLO 400 WR 2 h), and the non-coated composite metal oxide, according to at least one example embodiment.

Experimental Example 3: Confirmation of Deposited Carbon Species by XPS Analysis XPS spectroscopy tests are made using Quantum 2000 (Physical Electronics) equipment for the carbon-coated composite oxides obtained from Examples 1, 3, 4, 5, 6, 7, 8, and 12. FIG. 2 shows the XPS results of Example 1, and FIG. 3 shows the XPS results of Examples 3, 4, 6, 7, and 8. For the bare composite metal oxide and the carbon-coated composite metal oxides obtained from Example 1, Example 5, and Example 12, the composition analysis results based on the XPS spectrum are shown in the following Table 1 and Table 2.

FIG. 2 and FIG. 3 confirm that the carbon-coated composite oxides obtained from Example 1 to Example 7 exhibit an increase in a COOH peak and a C—C or C=C peak. The results confirm that the carbon coating formed on the composite oxide is a carbon material including a COOH moiety and a carbon-carbon covalent bond.

TABLE 1

|  | C1s | O1s | Mn2p | Ni2p |
|---|---|---|---|---|
| Bare composite metal oxide | 14.03 | 57.87 | 20.84 | 7.25 |
| Example 1 (OLO 400 DR 2 h) | 15.76 | 58.40 | 19.34 | 6.51 |
| Example 5 (OLO 400 DR 2 h & 5 atm) | 23.18 | 56.39 | 14.86 | 5.57 |

TABLE 2

|  | Li1s | C1s | O1s | Mn2p | Co2p | Ni2p |
|---|---|---|---|---|---|---|
| Bare composite oxide | 11.68 | 20.49 | 50.65 | 6.55 | 0.93 | 9.71 |
| Example 12 | 6.63 | 23.91 | 52.08 | 8.63 | 0.61 | 8.14 |

The results shown in Table 1 confirm that the heat treatments in Example 1 and Example 5 may increase the carbon amount without any substantial changes in the structure of the composite oxides. In Table 1, the values are obtained in the state that impurities such as Na are removed. The results of Table 2 confirm that the heat treatment of Example 12 may bring forth the formation of manganese carbonate on the surface.

Experimental Example 4: Evaluation of Carbon Coating Amount Based on Thermogravimetric Analysis A thermogravimetric analysis are made for the bare composite metal oxide, the carbon-coated composite metal oxides obtained from Example 1 (OLO 400 DR 2 h) and Example 2 (OLO 400 WR 2 h), and the carbon-coated composite metal oxides obtained from Example 4 (OLO 400 WR 20), Example 5 (OLO 400 WR 2 h & 2 A), Example 6 (OLO 400 WR 2 h & 5 A), and Example 11 (NCM 400 DR 1 hr). FIG. 3 shows TGA-DTGA curves for the carbon-coated composite metal oxides obtained from Example 1 and Example 2. FIG. 8 shows TGA and DTGA curves for the carbon-coated composite metal oxides obtained from Example 4 to Example 6. FIG. 18 shows TGA and DTGA curves for the carbon-coated composite metal oxide obtained from Example 11.

From these TGA-DTGA results, the carbon-coated composite metal oxide obtained from Example 1 (OLO 400 DR 2 h) includes 1.13 wt % of a carbon material, and the carbon-coated composite oxide obtained from Example 2 (OLO 400 WR 2 h) includes 0.8 wt % of a carbon material. In addition, it is understood that the carbon-coated composite metal oxide obtained from Example 4 (OLO 400 WR 20 h) includes 1.8 wt % of a carbon material, the carbon-coated composite metal oxide obtained from Example 5 (OLO 400 WR 2 h & 2 A) includes 3 wt % of a carbon material, and the carbon-coated composite metal oxide obtained from Example 6 (OLO 400 WR 2 h & 5 A) includes 9 wt % of a carbon material. The results of FIG. 18 confirm that the carbon-coated composite metal oxide obtained from Example 11 includes 0.5 wt % of a carbon material.

Experimental Example 5: Evaluation of Carbon Coating Uniformity by Carbon Mapping of Energy Dispersive X-Ray Spectroscopy (EDAX)

Figure 4:
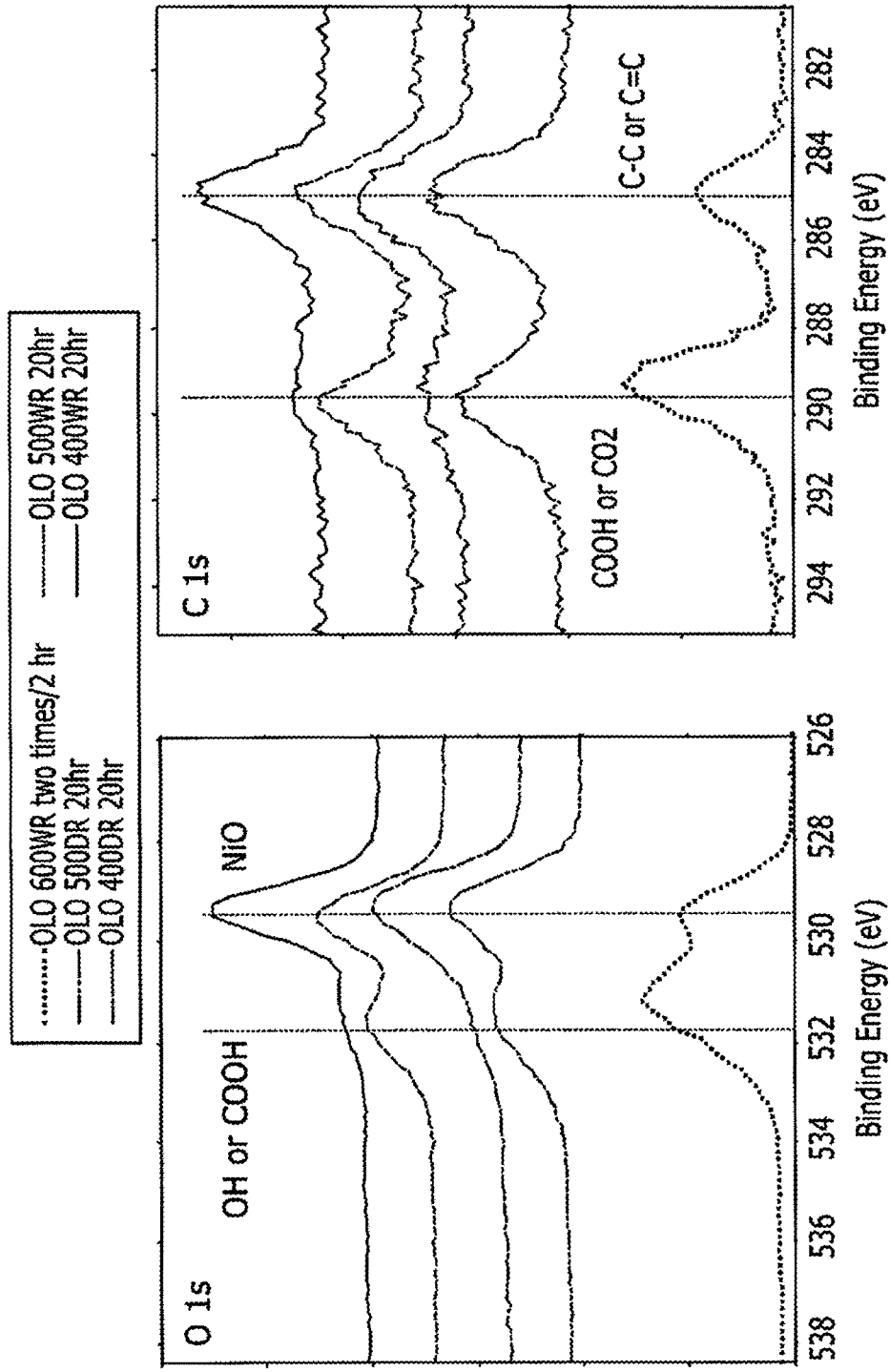
FIG. 4 shows XPS analysis results of the carbon-coated composite metal oxides obtained from Example 3 (OLO 400 DR 20 h), Example 4 (OLO 400 WR 20 h), Example 7 (OLO 500 DR 20 h), Example 8 (OLO 500 WR 20 h), and Example 9 (OLO 600WR twice/2 h), according to at least one example embodiment.

EDAX analysis is made for the carbon-coated composite metal oxides obtained from Example 1 and Example 2, and the EDAX carbon mapping results are shown in FIG. 4.

The results of FIG. 4 confirm that the carbon coatings in which carbon atoms are uniformly dispersed are formed in the carbon-coated composite metal oxides obtained from Example 1 and Example 2.

Experimental Example 6: Evaluation of Conductivity of Carbon-Coated Composite Oxide The conductivity of the bare composite metal oxide and the conductivity of the carbon-coated composite metal oxide obtained from Example 2 are measured and the results are compiled in Table 3. The results of Table 3 confirm that the carbon-coated composite metal oxide obtained from Example 2 exhibit a significantly improved conductivity in comparison of the bare composite metal oxide.

TABLE 3

| Sample | Conductivity S/cm |
|---|---|
| bare composite oxide | $1*10^{-8}$ |
| Example 2 | $1.83 * 10^{-7}$ |

Experimental Example 7: SEM Analysis of Coated OLO

Electron microscope analysis is made for the carbon-coated composite oxide obtained from Example 6 (OLO 400 WR 2 h & 5 A) and the bare composite oxide with using a ultrahigh resolution field emission scanning electron microscope (UHR-FE-SEM; Hitachi S-5500, resolution 0.4 nm, driven at 30 kV) equipment, and the results are shown in FIG. 9, FIG. 10, FIG. 11 and FIG. 12, respectively. Electron microscope analysis is made for the bare composite oxide and the carbon-coated composite oxide obtained from Example 11 and the results are shown in FIG. 20, FIG. 21, FIG. 22, and FIG. 23.

FIG. 9 and FIG. 10 confirm that OLO particles are coated with the carbon coatings, and the carbon coatings are filled between particles in the carbon-coated composite oxide obtained from Example 6. FIG. 11 and FIG. 12 confirm that the bare composite oxide has a clean porous surface. In the carbon-coated composite oxide of Example 6, the carbon material such as a metal carbonate may further aggregate OLO particles and thereby the conductivity may increase. In comparison with the results of FIG. 20 and FIG. 21 for the bare composite oxide, the carbon coated composite metal oxides as shown in FIG. 22 and FIG. 23 have a carbon material being coated on the surface thereof.

Experimental Example 8: Point EDAX Test

With a ultrahigh resolution field emission scanning electron microscope (UHR-FE-SEM; Hitachi S-5500, resolution 0.4 nm), an energy dispersive X-ray spectrometry analysis is conducted to assess the atomic composition for the carbon-coated composite oxide (OLO 400 WR 2 h & 5 A) obtained from Example 6. The results are shown in FIG. 13 to FIG. 16. From the results shown in FIG. 13 to FIG. 16, transparently grown lumps exhibiting a higher carbon concentration is a crystalline product composed of carbons.

Preparation of Lithium Ion Battery Including Carbon-Coated Composite Oxide as a Positive Electrode Active Material and Evaluation of Battery Characteristics Battery Preparation Example Each carbon coated positive electrode active material obtained from Example 1 to Example 9 is mixed with Denka black (a conductive material), PVDF (a binder), and NMP (a solvent) to prepare a slurry including carbon coated positive electrode active material:denka black:PVDF=94:3:3. Each carbon coated positive electrode active material obtained from Example 11 to Example 15 is mixed with Denka black (a conductive material), PVDF (a binder), and NMP (a solvent) to prepare a slurry including carbon coated positive electrode active material:denka black:PVDF=90:6:4. The obtained slurry is coated on an Al substrate (15 mm thickness) in a bar-coating method, dried at a high temperature under a reduced pressure, and pressed and punched to prepare an electrode for a coin cell. The electrode has capacity of about 1.7 mAh/cm$^2$ and a thickness of 50 to 60 mm. A 1.3 M LiPF$_6$/EC/DEC/EMC (3/5/2) solution is used as an electrolyte solution, and Li metal is used as a counter electrode.

Evaluation of Battery Characteristics I:

(1) Evaluation of Rate Characteristics for the Battery.

A charging and discharging experiment is conducted for each of the obtained batteries to measure the charge and discharge capacity and efficiency of the batteries at a first cycle (0.1C), and the results are shown in Table 4. In addition, the charge capacity of the batteries at a second cycle (0.2C) is measured, and the results are shown in Table 4 together. In addition, in order to verify the rate characteristics, the batteries are charged and discharged at (e.g., 0.5C/2C), and the results are shown in Table 4.

TABLE 4

| 1st cycle | | | Charge Rate at 0.5 C Ch | | | | |
|---|---|---|---|---|---|---|---|
| 0.1 C charge mAh/g | 0.1 C discharge mAh/g | Efficiency | 1 C discharge mAh/g | 2 C discharge mAh/g | 2 C/0.2 C % | 1 C Ch 1 C Dis mAh/g | Remarks |
| 277.1 | 227.7 | 82.2 | 162.8 | 137.9 | 65 | 140.3 | Bare |
| 288 | 241.8 | 84 | 165.2 | 170.4 | 74.9 | 165.5 | Example 1 (OLO 400 DR 2 h) |
| 243.4 | 207 | 85.1 | 161.9 | 167.1 | 81.8 | 165.8 | Example 2 OLO 400 WR 2 h) |
| 288.1 | 238.5 | 82.8 | 192.5 | 173.9 | 77.6 | 169.2 | Example 3 (OLO 400 DR 20 hr) |
| 302.4 | 259.1 | 85.7 | 217.8 | 198.2 | 80.4 | 195.9 | Example 4 (OLO 400 WR 20 hr) |
| 288.1 | 238.5 | 82.78 | 192.5 | 173.9 | 77.6 | 169.2 | Example 5 (OLO 400 WR 2 hr/2 A) |
| 302.4 | 259.1 | 85.68 | 217.8 | 198.2 | 80.4 | 195.9 | Example 6 (OLO 400 WR 2 hr/5 A) |
| 260.6 | 126.8 | 48.7 | 102.6 | 95.7 | 82.2 | 84.1 | Example 7 (OLO 500 DR 20 hr) |
| 276.9 | 153.4 | 55.4 | 120.5 | 110.1 | 78.6 | 101 | Example 8 (OLO 500 WR 20 hr) |
| 249.9 | 167.5 | 67.1 | 140.2 | 128.9 | 80.7 | 123.6 | Example 9 (OLO 600 WR twice 2 hr) |
| 302.1 | 239.1 | 79.1 | | 146.6 | 68.3 | | Example 10 (OLO 700 DR 2 hr) |

From Table 4, the battery including a positive electrode active material of each carbon-coated composite oxide obtained from Examples 1 to 9 exhibits an increase in a charge and discharge capacity at the first cycle and/or an enhancement of the rate characteristics of the positive electrode active material.

(2) Evaluation of Battery Lifetime Characteristics

Figure 5:
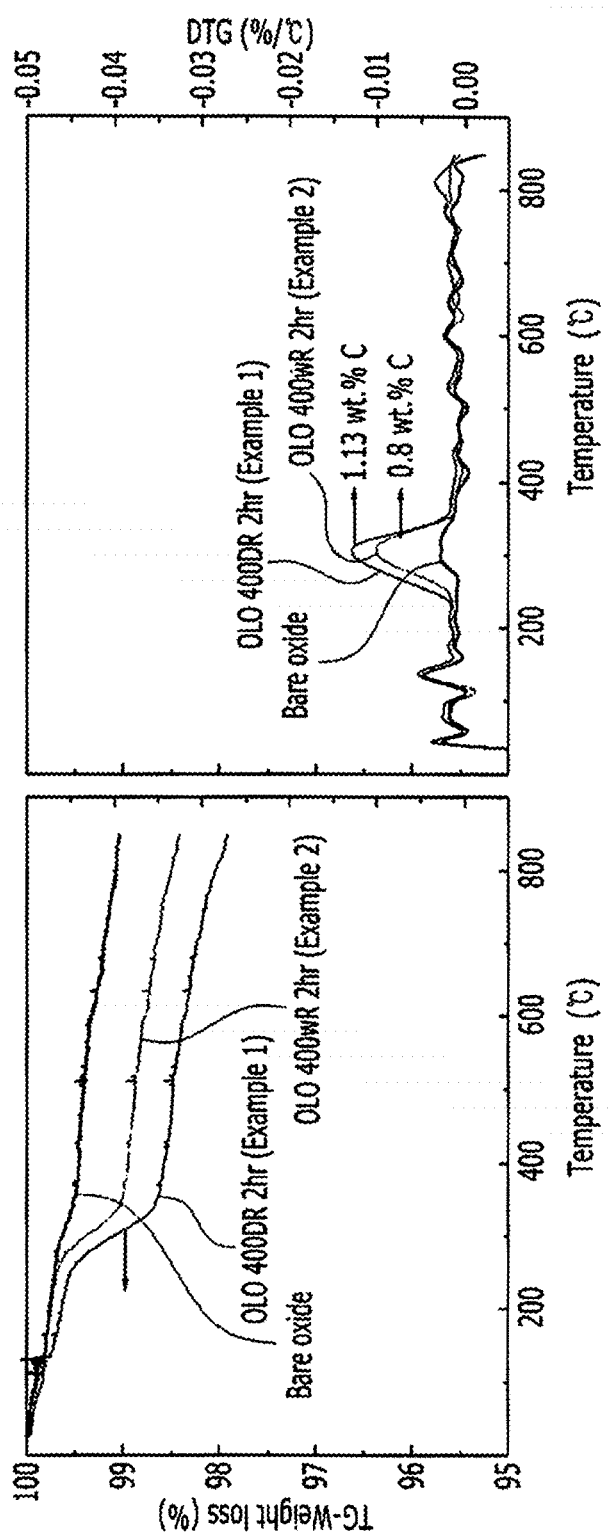
FIG. 5 shows TGA-DTGA curves, which are thermogravimetric analysis results of the carbon-coated composite metal oxides obtained from Example 1 and Example 2, according to at least one example embodiment.
Figure 6:
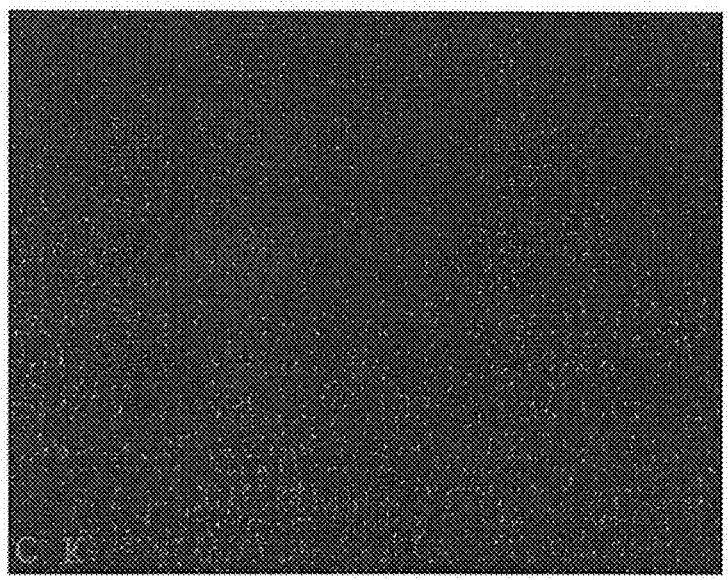
FIG. 6 shows the results of carbon mapping of energy dispersive X-ray spectrum (EDS) for a carbon-coated composite metal oxide obtained from Example 1, according to at least one example embodiment.
Figure 7:
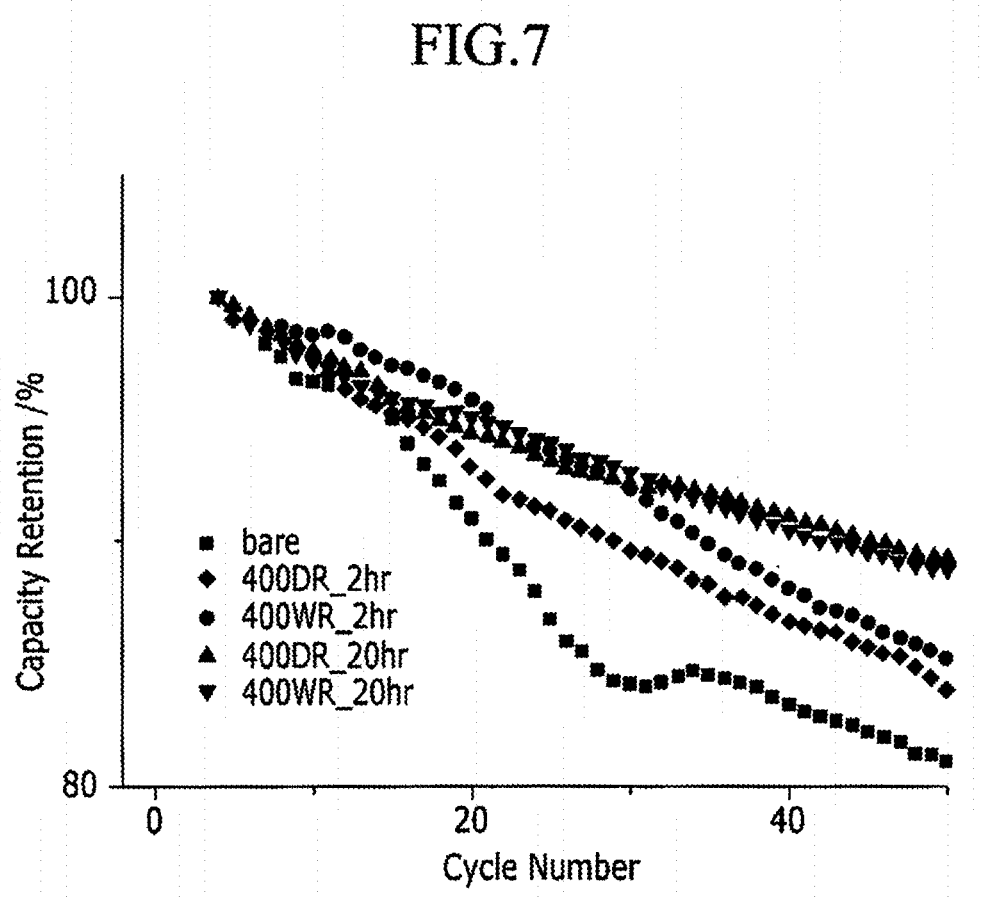
FIG. 7 is a view illustrating the results of tests for the cycle-life characteristic of a rechargeable lithium battery cell including carbon-coated lithium transition metal composite oxides obtained from Example 1 (400DR_2 h), Example 2 (400WR_2 h), Example 3 (400DR_20 h), and Example 4

For the battery including a positive electrode active material of each carbon-coated composite metal oxide obtained from Example 1 to Example 4, a specific capacity change is observed with increasing the cycle number under the following conditions, and the results are shown in FIG. 5:

1C/1C cycle, 25° C., 3 Volt to 4.6 Volt

From the results of FIG. 5, the batteries including a positive electrode active material of each carbon-coated composite metal oxide obtained from Examples 1 to 4 exhibit improved lifetime characteristics compared to the battery including a positive electrode active material of a non-coated composite oxide.

Evaluation of Battery Characteristics II:

(1) A cycle test is conducted for the battery including the carbon coated composite metal oxide obtained Example 11 under the following conditions and the results are shown in Table 5 and FIG. 24:

1C/1C cycle, 25° C., 2.5 Volt to 4.4 Volt or 4.5V, 1st cycle 0.1C rate, 2nd cycle 0.5C rate

TABLE 5

| Sample | | Capacity (mAh/g) | Initial efficiency (%) | Coulombic efficiency (%) | Battery Lifetime (% @ 100th) |
|---|---|---|---|---|---|
| Cut off 4.4 V | Bare composite oxide | 198.5 | 92.49 | 99.75 | 98.16 |
| | Example 11 | 198.6 | 94.79 | 99.99 | 99.49 |
| Cut off 4.45 V | Bare composite oxide | 206.7 | 92.90 | 99.78 | 95.07 |
| | Example 11 | 205.2 | 94.38 | 99.95 | 100.9 |
| Cut off 4.5 V | Bare composite oxide | 209.3 | 91.95 | 99.63 | 91.83 |
| | Example 11 | 209.0 | 93.65 | 99.89 | 100.3 |

In Table 5, the coulombic efficiency is an average of the charge/discharge efficiency for 100 times. The battery lifetime is a percentage of the capacity after 100 cycles with respect to the initial capacity.

The results of Table 5 and FIG. 24 confirm that the battery including the carbon coated composite metal oxide of Example 11 may have high initial efficiency and durability at a high voltage (e.g., 4.5. volt). The carbon coated composite metal oxide of Example 11 may show coulombic efficiency of 99.9% or higher, and thus may have enhanced stability.

(2) A cycle test is conducted for the battery including the bare composite metal oxide and the carbon coated composite metal oxide obtained Example 11, Example 13, Example 14, and Example 15 and the results are shown in Table 6:

TABLE 6

| Sample | Initial efficiency (%) | high-rate charge and discharge characteristics (%) | Capacity (mAh/g) | Battery lifetime (%) | Coulombic efficiency (%) |
|---|---|---|---|---|---|
| Bare composite oxide | 92.71 | 91.1 | 198.3 | 100 | 99.8 |
| Example 11 (400° C.) | 94.79 | 90.39 | 198.0 | 99.49 | 99.99 |
| Example 13 (500° C.) | 94.47 | 84.12 | 189.7 | 103.1 | 100.2 |
| Example 14 (600° C.) | 91.75 | 90.58 | 188.6 | 101.6 | 99.91 |
| Example 15 (700° C.) | 90.87 | 90.08 | 176.1 | 102 | 99.98 |

(3) A cycle test is conducted for the battery including the bare composite metal oxide and the carbon coated composite metal oxides obtained Example 11 and Example 12 and the results are shown in Table 7. Table 8, and Table 9:

TABLE 7

| Bare composite oxide | The amount of the carbon coating (%) | Initial efficiency (%) | high-rate charge and discharge characteristics (%) | capacity (mAh/g) | battery lifetime (%) | Coulombic efficiency (%) |
|---|---|---|---|---|---|---|
| 4.40 V | — | 92.71 | 91.1 | 198.3 | 100 | 99.8 |
| 4.45 V | — | 93.39 | 92.1 | 209.1 | 96.6 | 99.8 |
| 4.50 V | — | 91.74 | 91.7 | 211.0 | 94.3 | 99.7 |

TABLE 8

| Example 11 | The amount of the carbon coating (%) | Initial efficiency (%) | high-rate charge and discharge characteristics (%) | capacity (mAh/g) | battery lifetime (%) | Coulombic efficiency (%) |
|---|---|---|---|---|---|---|
| 4.40 V | 0.4 | 94.79 | 90.39 | 198.0 | 99.49 | 99.99 |
| 4.45 V | 0.4 | 94.38 | 90.28 | 204.2 | 100.9 | 99.95 |
| 4.50 V | 0.4 | 93.65 | 90.66 | 209.0 | 100.3 | 99.89 |

TABLE 9

| Example 12 | The amount of the carbon coating (%) | Initial efficiency (%) | high-rate charge and discharge characteristics (%) | capacity (mAh/g) | battery lifetime (%) | Coulombic efficiency (%) |
|---|---|---|---|---|---|---|
| 4.40 V | 0.6 | 95.58 | 92.25 | 200.0 | 98.1 | 99.96 |
| 4.45 V | 0.6 | 95.08 | 91.8 | 205.5 | 98.2 | 99.91 |
| 4.50 V | 0.6 | 94.13 | 92.2 | 209.3 | 95.5 | 99.87 |

The results of Table 7, Table 8, and Table 8 confirm that the carbon coated composite metal oxide of Examples 11 and 12 having higher amount of the carbon element due to a longer heat-treating time may show a higher level of initial efficiency, higher capacity, and/or more enhanced rate capability.

FIG. 26 is a flow chart describing a method of forming a carbon coating in accordance with a non-limiting example embodiment. In FIG. 26, the method starts at S100, where a lithium transition metal composite oxide is obtained. According to at least one example embodiment, the method continues to S110, where the lithium transition metal composite oxide is heated under an inert gas atmosphere. In step S120, the lithium transition metal composite oxide is heated in an atmosphere of a gas mixture including carbon dioxide and hydrocarbon to form a carbon coating. In step S130, the carbon-coated metal composite oxide is cooled. For example, the carbon-coated metal composite oxide may be cooled under an inert gas atmosphere.

While this disclosure has been described in connection with what is presently considered to be practical example embodiments, it is to be understood that the at least one example embodiment is not limited to the disclosure, but, on the contrary, is intended to cover various modifications and equivalent arrangements included within the spirit and scope of the appended claims.

What is claimed is:

1. A composite metal oxide represented by Chemical Formula 2 having a uniform carbon coating on a surface of the composite metal oxide:

$$Li_{0.9+a}M_bM'_cN_dO_e$$ [Chemical Formula 2]

wherein $0 \leq a \leq 1.6$, $0 \leq b \leq 2$, $0 \leq c \leq 2$, $0 \leq d \leq 2$, b, c, and d are the same or different and are not simultaneously equal to 0, e ranges from 1 to 4, M and M' are different from each other and are selected from Ni, Co, Mn, Mo, Cu, Fe, Cr, Ge, Al, Mg, Zr, W, Ru, Rh, Pd, Os, Ir, Pt, Sc, Ti, V, Ga, Nb, Ag, Hf, Au, Cs, B, Ba, and a combination thereof, and N is different from M and M' and is selected from Ni, Co, Mn, Mo, Cu, Fe, Cr, Ge, Al, Mg, Zr, W, Ru, Rh, Pd, Os, Ir, Pt, Sc, Ti, V, Ga, Nb, Ag, Hf, Au, Cs, and Ba, or selected from B, F, S, and P, and at least one of M, M', and N comprises Ni, Co, Mn, Mo, Cu, or Fe;

wherein the carbon coating includes a carbon material including a carbon-carbon covalent bond together with at least one selected from a COOH moiety, an —OH moiety, and a carbonate moiety.

2. The composite metal oxide of claim 1, wherein the composite metal oxide is a positive electrode active material for a rechargeable lithium battery.

3. The composite metal oxide of claim 1, wherein the carbon coating is uniformly distributed on the composite metal oxide and has uniform distribution of carbon atoms as confirmed by carbon mapping of an energy dispersive X-ray spectrum of the composite metal oxide.

4. The composite metal oxide of claim 1, wherein the lithium transition metal composite oxide is a nickel-cobalt-manganese (NCM) oxide represented by Chemical Formula 2-1:

$$LiNi_aCo_bMn_cMe_dO_2$$ [Chemical Formula 2-1]

wherein, a is a number in a range 0.01 to 0.9, b is a number in a range 0.01 to 0.9, c is a number in a range 0.01 to 0.9, d is a number in a range 0 to 0.5, a+b+c+d=1, and Me comprises Al, Ti, or a combination thereof.

5. The composite metal oxide of claim 1, wherein the composite metal oxide is selected from:

$LiNiO_2$, $LiCoO_2$, $LiMn_2O_4$, $LiNi_xCo_{1-x}O_2$ wherein $0<x<1$, $LiNi_{1-x-y}Co_xMn_yO_2$ wherein $0<x<1$, $0<y<1$, $0<x+y<1$, $LiM^1_{(1-a)}M^2_aXO_4$ wherein $M^1$ is Mn, Co, Cu, or Ge, $M^2$ is a transition metal other than Mo and Co, $0 \leq a \leq 0.5$, and X is P, V, or Ti, $LiMnPO_4$, $LiFeBO_3$, $LiFePO_4$, $LiFeVO_4$, $LiFeTiO_4$, $LiFeGeO_4$, $Li_xCo_{1-y'-z'}Ni_{y'}M_{z'}O_{2-a}X_a$ wherein $1.6 \geq x' \geq 0.9$, $1 \geq y' \geq 0$, $0.5 \geq z' \geq 0$, $1 \geq a \geq 0$, and X is O, F, S, P, or a combination thereof, $Li_{x''}Mn_{2-y'}M_{y'}O_{4-a}X_a$ wherein $1.6 \geq x'' \geq 0.9$, $1 \geq y'' \geq 0$, $1 \geq a \geq 0$, M is Co, Mo, W, V, Ti, Al, Zr, Ru, Rh, Pd, Os, Ir, Pt, or a combination thereof, and X is O, F, S, P, or a combination thereof, and a combination thereof.

6. The composite metal oxide of claim 1, wherein the composite metal oxide is an overlithiated oxide (OLO) represented by the following Chemical Formula 3 and having a lithium content of a mole ratio of greater than 1:

$$Li_{1+a}M_bM'_cN_dO_e$$ [Chemical Formula 3]

wherein $0<a \leq 1.5$, $0 \leq b \leq 2$, $0 \leq c \leq 2$, $0 \leq d \leq 2$, b, c, and d are not simultaneously equal to 0, e ranges from 2 to 4, and M, M', and N are different from each other and are selected from Ni, Co, Mn, Mo, Cu, Fe, Cr, Ge, Al, Mg, Zr, W, Ru, Rh, Pd, Os, Ir, Pt, Sc, Ti, V, Ga, Nb, Ag, Hf, Au, Cs, B, and Ba, and at least one of the M, M' and N comprises Ni, Co, Mn, Mo, Cu, or Fe.

7. The composite metal oxide of claim 6, wherein the overlithiated oxide represented by the above Chemical Formula 3 is a lithium manganese oxide represented by the following Chemical Formula 4:

$$yLi[Li_{1/3}Me_{2/3}]O_2 \cdot (1-y)LiMe'O_2$$ [Chemical Formula 4]

wherein $0<y \leq 1$, Me is selected from Mn, Mo, W, V, Ti, Zr, Ru, Rh, Pd, Os, Ir, Pt, and a combination thereof, Me' is selected from Ni, Mn, Co, and a combination thereof, and one of Me and Me' includes Mn.

8. The composite metal oxide of claim 1, wherein the carbon coating is included in an amount greater than or equal to about 0.01 wt % based on a total weight of the lithium transition metal composite oxide.

9. A rechargeable lithium battery comprising a positive electrode active material comprising a composite metal oxide represented by the following Chemical Formula 2 and a carbon coating uniformly formed on the composite metal oxide:

$$Li_{0.9+a}M_bM'_cN_dO_e \quad \text{[Chemical Formula 2]}$$

wherein

0≤a≤1.6, 0≤b≤2, 0≤c≤, 0≤d≤2, b, c, and d are not simultaneously equal to 0, e ranges from 1 to 4, M and M' are different from each other and are metal elements selected from Ni, Co, Mn, Mo, Cu, Fe, Cr, Ge, Al, Mg, Zr, W, Ru, Rh, Pd, Os, Ir, Pt, Sc, Ti, V, Ga, Nb, Ag, Hf, Au, Cs, B, and Ba, and N is different from M and M', and is a metal element selected from Ni, Co, Mn, Mo, Cu, Fe, Cr, Ge, Al, Mg, Zr, W, Ru, Rh, Pd, Os, Ir, Pt, Sc, Ti, V, Ga, Nb, Ag, Hf, Au, Cs, B, and Ba or selected from Ti, V, B, F, S, and P, and at least one of the M, M', and N comprises Ni, Co, Mn, Mo, Cu, or Fe;

wherein the carbon coating includes a carbon material including a carbon-carbon covalent bond together with at least one selected from a COOH moiety, an —OH moiety, and a carbonate moiety.

* * * * *